(12) United States Patent
Pawlicki et al.

(10) Patent No.: US 7,679,498 B2
(45) Date of Patent: Mar. 16, 2010

(54) OBJECT DETECTION SYSTEM FOR VEHICLE

(75) Inventors: John A. Pawlicki, Warren, MI (US); Martha A. McMahon, Ann Arbor, MI (US); Steven G. Chinn, Rochester Hills, MI (US); Joel S. Gibson, Linden, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/329,029

(22) Filed: Dec. 5, 2008

(65) Prior Publication Data

US 2009/0147083 A1    Jun. 11, 2009

Related U.S. Application Data

(62) Division of application No. 11/408,776, filed on Apr. 21, 2006, now Pat. No. 7,463,138, which is a division of application No. 10/427,051, filed on Apr. 30, 2003, now Pat. No. 7,038,577.

(60) Provisional application No. 60/433,700, filed on Dec. 16, 2002, provisional application No. 60/377,524, filed on May 3, 2002.

(51) Int. Cl.
*B60Q 1/00* (2006.01)

(52) U.S. Cl. .................. 340/435; 340/436; 340/937; 701/41; 701/301

(58) Field of Classification Search .............. 340/435, 340/436, 438, 935, 937, 939; 701/301, 41
See application file for complete search history.

(56) References Cited

U.S. PATENT DOCUMENTS

| 4,600,913 | A | 7/1986 | Caine |
| 4,907,870 | A | 3/1990 | Brucker |
| 4,971,430 | A | 11/1990 | Lynas |
| 5,097,362 | A | 3/1992 | Lynas |
| 5,177,685 | A | 1/1993 | Davis et al. |

(Continued)

FOREIGN PATENT DOCUMENTS

EP    0 354 261 A1    2/1990

(Continued)

OTHER PUBLICATIONS

Van Leuven et al., "Real-Time Vehicle Tracking in Image Sequences", IEEE, US, vol. 3, May 21, 2001, pp. 2049-2054, XP010547308.

(Continued)

*Primary Examiner*—Toan N Pham
(74) *Attorney, Agent, or Firm*—Van Dyke, Gardner, Linn & Burkhart LLP

(57) ABSTRACT

An imaging system for a vehicle includes an imaging sensor and a control. The imaging sensor is operable to capture an image of a scene occurring exteriorly of the vehicle. The control is responsive to the imaging sensor. The imaging system may be associated with a side object detection system, a lane change assist system, a lane departure warning system, a monitoring system, a passive steering system and/or the like. The control may be operable to process a reduced image data set more than other image data, which are representative of areas of the captured image outside of a target zone, to detect objects present within the target zone.

6 Claims, 14 Drawing Sheets

U.S. PATENT DOCUMENTS

| | | | |
|---|---|---|---|
| 5,189,561 | A | 2/1993 | Hong |
| 5,424,952 | A | 6/1995 | Asayama |
| 5,500,766 | A | 3/1996 | Stonecypher |
| 5,521,633 | A | 5/1996 | Nakajima et al. |
| 5,550,677 | A | 8/1996 | Schofield et al. |
| 5,581,464 | A | 12/1996 | Woll et al. |
| 5,642,299 | A | 6/1997 | Hardin et al. |
| 5,670,935 | A | 9/1997 | Schofield et al. |
| 5,715,093 | A | 2/1998 | Schierbeek et al. |
| 5,790,403 | A | 8/1998 | Nakayama |
| 5,796,094 | A | 8/1998 | Schofield et al. |
| 5,877,897 | A | 3/1999 | Schofield et al. |
| 5,884,212 | A | 3/1999 | Lion |
| 5,949,331 | A | 9/1999 | Schofield et al. |
| 6,009,377 | A * | 12/1999 | Hiwatashi ............. 701/301 |
| 6,044,321 | A | 3/2000 | Nakamura et al. |
| 6,097,023 | A | 8/2000 | Schofield et al. |
| 6,173,222 | B1 * | 1/2001 | Seo et al. ................. 701/41 |
| 6,201,236 | B1 | 3/2001 | Juds |
| 6,201,642 | B1 | 3/2001 | Bos |
| 6,222,447 | B1 | 4/2001 | Schofield et al. |
| 6,243,003 | B1 | 6/2001 | DeLine et al. |
| 6,269,308 | B1 | 7/2001 | Kodaka et al. |
| 6,278,377 | B1 | 8/2001 | DeLine et al. |
| 6,282,483 | B1 | 8/2001 | Yano et al. |
| 6,285,393 | B1 | 9/2001 | Shimoura et al. |
| 6,313,454 | B1 | 11/2001 | Bos et al. |
| 6,317,057 | B1 | 11/2001 | Lee |
| 6,320,176 | B1 | 11/2001 | Schofield et al. |
| 6,353,392 | B1 | 3/2002 | Schofield et al. |
| 6,396,397 | B1 | 5/2002 | Bos et al. |
| 6,411,204 | B1 | 6/2002 | Bloomfield et al. |
| 6,420,975 | B1 | 7/2002 | DeLine et al. |
| 6,433,676 | B2 | 8/2002 | DeLine et al. |
| 6,485,155 | B1 | 11/2002 | Duroux et al. |
| 6,580,996 | B1 | 6/2003 | Friedrich |
| 6,594,583 | B2 | 7/2003 | Ogura et al. |
| 6,671,607 | B2 | 12/2003 | Ishizu et al. |
| 6,691,008 | B2 * | 2/2004 | Kondo et al. ............... 701/41 |
| 6,708,100 | B2 | 3/2004 | Russell et al. |
| 6,748,312 | B2 | 6/2004 | Russell et al. |
| 6,823,241 | B2 | 11/2004 | Shirato et al. |
| 6,941,216 | B2 | 9/2005 | Isogai et al. |
| 6,968,266 | B2 | 11/2005 | Ahmed-Zaid et al. |
| 7,038,577 | B2 | 5/2006 | Pawlicki et al. |
| 7,151,844 | B2 | 12/2006 | Stevenson et al. |
| 7,295,682 | B2 | 11/2007 | Otsuka et al. |
| 7,463,138 | B2 | 12/2008 | Pawlicki et al. |
| 2002/0003571 | A1 | 1/2002 | Schofield et al. |
| 2002/0159270 | A1 | 10/2002 | Lynam et al. |
| 2002/0188392 | A1 | 12/2002 | Breed et al. |
| 2003/0025597 | A1 | 2/2003 | Schofield |
| 2003/0052773 | A1 | 3/2003 | Sjonell |
| 2003/0156015 | A1 | 8/2003 | Winner et al. |
| 2003/0169522 | A1 | 9/2003 | Schofield et al. |
| 2004/0149504 | A1 | 8/2004 | Swoboda et al. |

FOREIGN PATENT DOCUMENTS

| | | |
|---|---|---|
| EP | 0591743 | 4/1994 |
| EP | 0755524 | 10/1995 |

OTHER PUBLICATIONS

Van Leeuwen et al., "Requirements for Motion Estimation in Image Sequences for Traffic Applications", IEEE, US, vol. 1, May 24, 1999, pp. 145-150, XP010340272.

Van Leeuwen et al "Motion Estimation with a Mobile Camera for Traffic Applications", IEEE, US, Oct. 3, 2000, pp. 58-63.

Van Leeuvven et al., "Motion Interpretation for In-Car Vision Systems", IEEE, US, vol. 1, Sep. 30, 2002, pp. 135-140.

Van Leeuwen et al., "Motion Estimation in Image Sequences for Traffic Applications", vol. 1, May 1, 2000, pp. 354-359, XP002529773.

Pratt, "Digital Image Processing, Passage—ED.3", John Wiley & Sons, US, Jan. 1, 2001, pp. 657-659, XP002529771.

Supplemental European Search Report completed May 29, 2009, from corresponding European Application No. EP 03 72 1946.

* cited by examiner

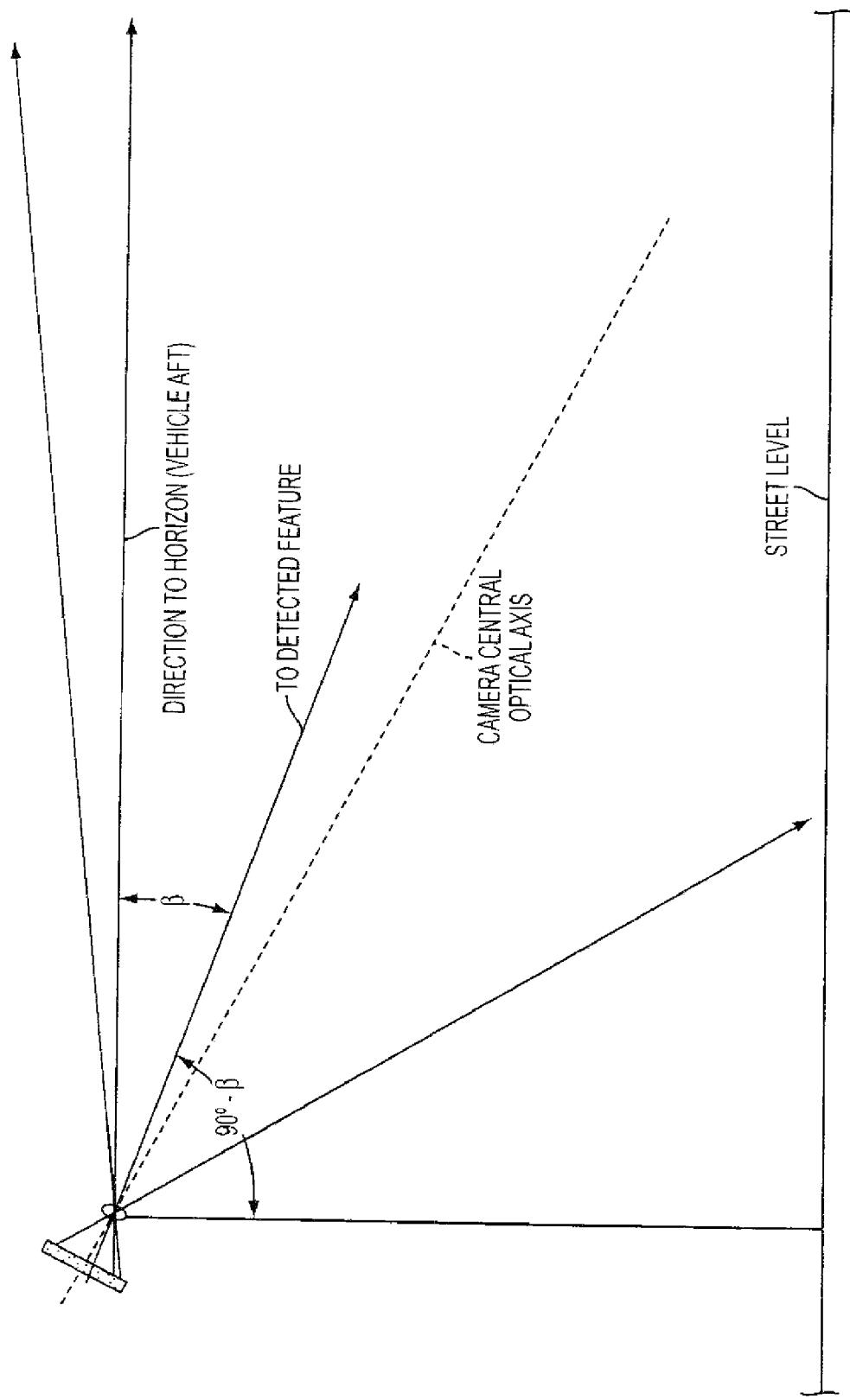

| -00002 | +00000 | +00002 | +00003 | -00004 |
|--------|--------|--------|--------|--------|
| -00001 | +00000 | +00001 | +00002 | +00003 |
| -00001 | +00000 | +00001 | +00002 | +00003 |
| -00001 | +00000 | +00001 | +00002 | +00003 |
| -00002 | +00000 | +00002 | +00003 | +00004 |
| -00002 | +00000 | +00002 | +00003 | +00004 |
| -00003 | +00000 | +00003 | +00004 | +00005 |
| -00003 | +00000 | +00003 | +00004 | +00006 |

FIG. 11F

OBJECT DETECTION SYSTEM FOR VEHICLE

CROSS REFERENCE TO RELATED APPLICATIONS

The present application is a divisional application of U.S. patent application Ser. No. 11/408,776, filed Apr. 21, 2006, now U.S. Pat. No. 7,463,138, which is a divisional application of U.S. patent application Ser. No. 10/427,051, filed Apr. 30, 2003, now U.S. Pat. No. 7,038,577, which claims priority of U.S. provisional applications, Ser. No. 60/433,700, filed Dec. 16, 2002; and Ser. No. 60/377,524, filed May 3, 2002, which are all hereby incorporated herein by reference in their entireties.

FIELD OF THE INVENTION

The present invention relates generally to vision or imaging systems for vehicles and is related to object detection systems and, more particularly, to imaging systems which are operable to determine if a vehicle or object of interest is adjacent to, forward of or rearward of the subject vehicle to assist the driver in changing lanes or parking the vehicle. The present invention also relates generally to a lane departure warning system for a vehicle.

BACKGROUND OF THE INVENTION

Many lane change aid/side object detection/lane departure warning devices or systems and the like have been proposed which are operable to detect a vehicle or other object that is present next to, ahead of or rearward of the equipped vehicle or in an adjacent lane with respect to the equipped vehicle. Such systems typically utilize statistical methodologies to statistically analyze the images captured by a camera or sensor at the vehicle to estimate whether a vehicle or other object is adjacent to the equipped vehicle. Because such systems typically use statistical methodologies to determine a likelihood or probability that a detected object is a vehicle, and for other reasons, the systems may generate false positive detections, where the system indicates that a vehicle is adjacent to, forward of or rearward of the subject vehicle when there is no vehicle adjacent to, forward of or rearward of the subject vehicle, or false negative detections, where the system, for example, indicates that there is no vehicle adjacent to the subject vehicle when there actually is a vehicle in the adjacent lane.

Such known and proposed systems are operable to statistically analyze substantially all of the pixels in a pixelated image as captured by a pixelated image capture device or camera. Also, such systems may utilize algorithmic means, such as flow algorithms or the like, to track substantially each pixel or most portions of the image to determine how substantially each pixel or most portions of the image has changed from one frame to the next. Such frame by frame flow algorithms and systems may not be able to track a vehicle which is moving at generally the same speed as the equipped vehicle, because there may be little or no relative movement between the vehicles and, consequently, little or no change from one frame to the next. Because the systems may thus substantially continuously analyze substantially every pixel for substantially every frame captured and track such pixels and frames from one frame to the next, such systems may require expensive processing controls and computationally expensive software to continuously handle and process substantially all of the data from substantially all of the pixels in substantially each captured image or frame.

Many automotive lane departure warning (LDW) systems (also known as run off road warning systems) are being developed and implemented on vehicles today. These systems warn a driver of a vehicle when their vehicle crosses the road's land markings or when there is a clear trajectory indicating they will imminently do so. The warnings are typically not activated if the corresponding turn signal is on, as this implies the driver intends to make a lane change maneuver. Additionally, the warning systems may be deactivated below a certain vehicle speed. The driver interface for these systems may be in the form of a visual warning (such as an indicator light) and/or an audible warning (typically a rumble strip sound). One application warns a driver with an indicator light if the vehicle tire is crossing the lane marker and no other vehicle is detected in the driver's corresponding blind spot; and/or further warns the driver with an audible warning if the vehicle is crossing into the adjacent lane and there is a vehicle detected in the driver's blind spot.

There is concern that the current systems will be more of a driver annoyance or distraction than will be acceptable by the consumer market. Using the turn signal as the principle means of establishing to the warning system that the maneuver is intentional does not reflect typical driving patterns and, thus, many intended maneuvers will cause a warning. As a driver gets annoyed by warnings during intended maneuvers, the driver will likely begin to ignore the warnings, which may result in an accident when the warning is appropriate.

Therefore, there is a need in the art for an object detection system, such as a blind spot detection system or lane change assist system or lane departure warning system or the like, which overcomes the short comings of the prior art.

SUMMARY OF THE PRESENT INVENTION

The present invention is intended to provide an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, which is operable to detect and/or identify a vehicle or other object of interest at the side, front or rear of the vehicle equipped with the object detection system. The object detection system of the present invention, such as a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

In accordance with the present invention, portions or subsets of the image data of the captured image which are representative of areas of interest of the exterior scene where a vehicle or object of interest is likely to be present are weighted and utilized more than other portions or other subsets of the image data of the captured image representative of other areas of the exterior scene where such a vehicle or object of interest is unlikely to be present. Thus, in accordance with the present invention, a reduced set or subset of captured image data is processed based on where geographically vehicles of interest are realistically expected to be in the field of view of the image capture device. More specifically, for example, the control may process and weight the portion of the captured image data set that is associated with a lower portion of the image capture device field of view that is typically directed generally toward the road surface. Preferably, less than approximately 75% of the image data captured by the multi-pixel camera arrangement is utilized for object detection, more preferably, less than approximately 66% of the image data captured by the multi-pixel camera arrangement is utilized for object detection, and most preferably, less than approximately 50% of the image data captured by the multi-pixel camera arrangement is utilized for object detection.

It is further envisioned that the control may process or weight image data within the reduced set or subset which is indicative of physical characteristics of a vehicle or object of interest more than other image data within the reduced set which is not likely indicative of or cannot be indicative of such a vehicle or object of interest. The control thus may further reduce the processing requirements within the reduced set or sets of image data of the captured image.

Preferably, a multi-pixel array is utilized, such as a CMOS sensor or a CCD sensor or the like, such as disclosed in commonly assigned U.S. Pat. Nos. 5,550,677; 5,670,935; 5,796,094; and 6,097,023, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, which are hereby incorporated herein by reference, or such as an extended dynamic range camera, such as the types disclosed in U.S. provisional application Ser. No. 60/426,239, filed Nov. 14, 2002 by Bingle for CAMERA MODULE FOR VEHICLE, which is hereby incorporated herein by reference. Because a multi-pixel array is utilized, the image or portion of the image captured by a particular pixel or set of pixels may be associated with a particular area of the exterior scene and the image data captured by the particular pixel or set of pixels may be processed accordingly.

According to an aspect of the present invention, an object detection system for a vehicle comprises a pixelated imaging array sensor and a control. The imaging array sensor is directed generally exteriorly from the vehicle to capture an image of a scene occurring exteriorly, such as toward the side, front or rear, of the vehicle. The control comprises an edge detection algorithm and is responsive to an output of the imaging array sensor in order to detect edges of objects present exteriorly of the vehicle. The control is operable to process and weight and utilize a reduced image data set or subset representative of a target area of the exterior scene more than other image data representative of other areas of the exterior scene. The target area or zone comprises a subset or portion of the image captured by the imaging array sensor and is representative of a subset or portion of the exterior scene within the field of view of the imaging array sensor. The control thus processes a reduced amount of image data and reduces processing of image data that is unlikely to indicate a vehicle or other object of interest. The imaging array sensor may be directed partially downwardly such that an upper portion of the captured image is generally at or along the horizon.

The control may be operable to process portions of the captured image representative of a target area of the scene and may reduce processing or reduce utilization of other portions of the captured image representative of areas outside of the target area and, thus, reduce the processing of edges or pixels which detect areas where detected edges are likely indicative of insignificant objects or which are not or cannot be indicative of a vehicle or significant object. The control is thus operable to process and weight and utilize image data from certain targeted portions of the captured image more than image data from other portions which are outside of the targeted portions or the target zone or area of interest.

The control may determine whether the detected edges within the target area are part of a vehicle in an adjacent lane in response to various characteristics of the detected edges which may be indicative of a vehicle or a significant object. For example, the control may be operable to process certain areas or portions or subsets of the captured image data or may be operable to process horizontal detected edges and filter out or substantially ignore vertical detected edges. The control may also or otherwise be operable to process detected edges which have a concentration of the edge or edges in a particular area or zone within the captured image. The control thus may determine that one or more detected edges are part of a vehicle in the adjacent lane in response to the edges meeting one or more threshold levels. Also, the control may adjust the minimum or maximum threshold levels in response to various characteristics or driving conditions or road conditions. For example, the control may be operable to process or substantially ignore detected edges in response to at least one of a size, location, intensity, distance, and/or speed of the detected edges relative to the vehicle, and may adjust the minimum or maximum threshold levels or criteria in response to a distance between the detected edges and the subject vehicle, a road curvature, lighting conditions and/or the like.

According to another aspect of the present invention, an imaging system for a vehicle comprises an imaging array sensor having a plurality of photo-sensing or accumulating or light sensing pixels, and a control responsive to the imaging array sensor. The imaging array sensor is positioned at the vehicle and operable to capture an image of a scene occurring exteriorly of the vehicle. The control is operable to process the captured image, which comprises an image data set representative of the exterior scene. The control is operable to apply an edge detection algorithm to the image captured by the imaging array sensor to detect edges or objects present exteriorly of the vehicle. The control may be operable to determine whether the detected edges or objects are indicative of a significant object or object of interest. The control is operable to process a reduced data set or subset of the image data set, which is representative of a target zone or area of the exterior scene, more than other image data representative of areas of the exterior scene which are outside of the target zone. The control thus may process image data of the reduced data set or subset, such as by applying an edge detection algorithm to the reduced data set, and substantially discount or limit processing of the other image data which is outside of the reduced data set or subset of the image or of the target zone of the exterior scene.

The control may be operable to adjust the reduced data set or subset and the corresponding target zone in response to various threshold criterion. The control may be operable to adjust the reduced data set or target zone in response to a distance to a detected edge or object. The control may approximate a distance to a portion of a detected edge or object in response to a location of the pixel or pixels capturing the portion in the captured image. The pixel location may be determined relative to a target pixel which may be directed generally at the horizon and along the direction of travel of the vehicle. For example, the control may be operable to approximate the distance using spherical trigonometry in response to a pixel size, pixel resolution and field of view of the imaging array sensor. The control may access an information array which provides a calculated distance for each pixel within the reduced data set or target zone to approximate the distance to the portion of the detected edge or object.

In order to determine if a detected edge or detected edges is/are part of or indicative of a vehicle, the control may be operable to determine if the detected edge or edges is/are associated with an ellipse or partial ellipse, since the ellipse or partial ellipse may be indicative of a tire of a vehicle near the equipped vehicle, such as a vehicle in a lane adjacent to the equipped vehicle. The control may also be operable to track one or more of the detected edges between subsequent frames captured by the imaging array sensor to classify and/or identify the object or objects associated with the detected edge or edges.

The object detection system or imaging system may comprise a lane change assist system operable to detect vehicles or objects of interest sidewardly of the vehicle. Optionally, the control may be in communication with a forward facing imaging system. The forward facing imaging system may communicate at least one of oncoming traffic information, leading traffic information and lane marking information to the control of the lane change assist system to assist the lane change assist system in readily identifying vehicles at the side of the subject vehicle or adjusting a reduced data set or an area or zone of interest within the captured image. The control may be operable to adjust the reduced data set or target zone in response to the forward facing imaging system.

Optionally, the object detection system or imaging system may comprise a forward facing imaging system, such as a lane departure warning system. The lane departure warning system may provide a warning or alert signal to the driver of the vehicle in response to a detection of the vehicle drifting or leaving its occupied lane.

Optionally, the forward facing imaging system may include or may be in communication with a passive steering system which is operable to adjust a steering direction of the vehicle in response to a detection by the imaging system of the vehicle drifting or leaving its occupied lane. Optionally, the forward facing imaging system may include or may be in communication with an adaptive speed control which is operable to adjust a cruise control or speed setting of the vehicle in response to road conditions or traffic conditions detected by the imaging system. Optionally, the imaging system may be in communication with a remote receiving device to provide image data to a display system remote from the vehicle such that a person remote from the vehicle may receive and view the image data with the remote receiving device to determine the location and/or condition of the vehicle or its occupants.

According to another aspect of the present invention, a lane change assist system for a vehicle comprises an imaging sensor and a control. The imaging sensor is positioned at the vehicle and directed generally sidewardly from the vehicle to capture an image of a scene occurring toward the side of the vehicle. The control is operable to process the image captured by the imaging array sensor to detect objects sidewardly of the vehicle. The captured image comprises an image data set representative of the exterior scene. The control is operable to process a reduced image data set of the image data set more than other image data of the image data set. The reduced image data set is representative of a target zone of the captured image.

The control may be operable to adjust the reduced data set or subset or target zone in response to an adjustment input. In one form, the adjustment input comprises an output from an ambient light sensor, a headlamp control and/or a manual control. The control may be operable to adjust the reduced data set or subset or target zone between a daytime zone and a nighttime zone in response to the output. The control may be operable to adjust a height input for the imaging array sensor such that the daytime zone is generally along the road surface and the nighttime zone is generally at a height of headlamps of vehicles.

In another form, the control may be operable to adjust the reduced data set or subset or target zone in response to a detection of the vehicle traveling through or along a curved section of road. The adjustment input may comprise an output from a forward facing imaging system or a detection by the imaging sensor and control that the vehicle is traveling through a curved section of road, such as by the imaging sensor and control detecting and identifying curved lane markers or the like along the road surface.

It is further envisioned that many aspects of the present invention are suitable for use in other vehicle vision or imaging systems, such as other side object detection systems, forward facing vision systems, such as lane departure warning systems, forward park aid systems or the like, rearward facing vision systems, such as back up aid systems or rearward park aid systems or the like, or panoramic vision systems and/or the like.

The present invention may also or otherwise provide a lane departure warning system that reduces and may substantially eliminate the provision of an unwarranted and/or unwanted visual or audible warning signals to a driver of a vehicle when the driver intends to perform the driving maneuver.

According to another aspect of the present invention, a lane departure warning system includes an imaging sensor mounted at a forward portion of a vehicle and operable to capture an image of a scene generally forwardly of the vehicle, and a control for providing a warning signal to a driver of the vehicle in response to an image captured by the imaging sensor. The control is operable to process the image captured to detect at least one of a lane marking, a road edge, a shoulder edge and another vehicle or object. The lane departure warning system provides the warning signal in response to a detected object or marking and further in response to the vehicle speed or other parameters which provide additional information concerning the likelihood that a warning signal is necessary.

Therefore, the present invention provides an object detection system or imaging system, such as a lane change assist system or other type of object detection or imaging system, which is operable to detect and identify vehicles or other objects of interest exteriorly, such as sidewardly, rearwardly, and/or forwardly of the subject vehicle. The imaging system may primarily process image data within a reduced data set or subset of the captured image data, where the reduced data set is representative of a target zone or area of interest within the field of view of the imaging system, and may adjust the reduced data set or zone or area in response to various inputs or characteristics, such as road conditions, lighting or driving conditions and/or characteristics of the detected edges or objects. The imaging system of the present invention is operable to detect edges of objects, and particularly horizontal edges of objects, to provide improved recognition or identification of the detected objects. The imaging system of the present invention may be operable to limit processing of or to filter or substantially eliminate or reduce the effect of edges or characteristics which are indicative of insignificant objects, thereby reducing the level of processing required on the captured images.

The edge detection process or algorithm of the lane change assist system of the present invention thus may provide for a low cost processing system or algorithm, which does not require the statistical methodologies and computationally expensive flow algorithms of the prior art systems. Also, the edge detection process may detect edges and objects even when there is little or no relative movement between the subject vehicle and the detected edge or object. The present invention thus may provide a faster processing of the captured images, which may be performed by a processor having lower processing capabilities then processors required for the prior art systems. The lane change assist system may also provide a low cost and fast approximation of a longitudinal and/or lateral and/or total distance between the subject vehicle and a detected edge or object exteriorly of the vehicle and may adjust a threshold detection level in response to the approximated distance.

These and other objects, advantages, purposes and features of the present invention will become apparent upon review of the following specification in conjunction with the drawings.

BRIEF DESCRIPTION OF THE DRAWINGS

FIGS. 11A-F are diagrams of a virtual camera and characteristics thereof useful in calculating a distance from the camera of the lane change assist system to an object detected in the field of view of the camera;

DESCRIPTION OF THE PREFERRED EMBODIMENTS

Figure 1:
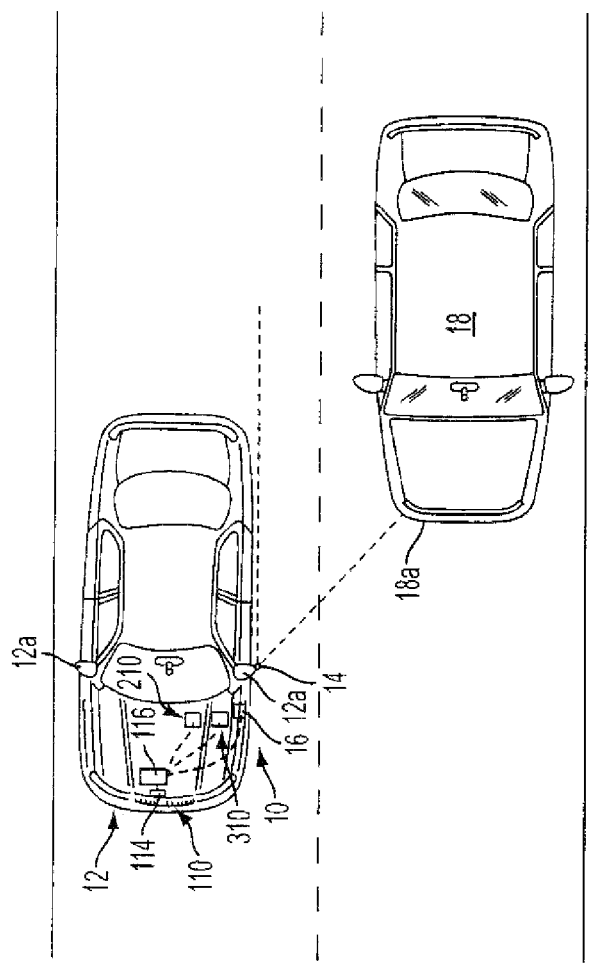
FIG. 1 is a top plan view of a vehicle equipped with a lane change assist system in accordance with the present invention, as the vehicle travels along a section of road.
Figure 2:
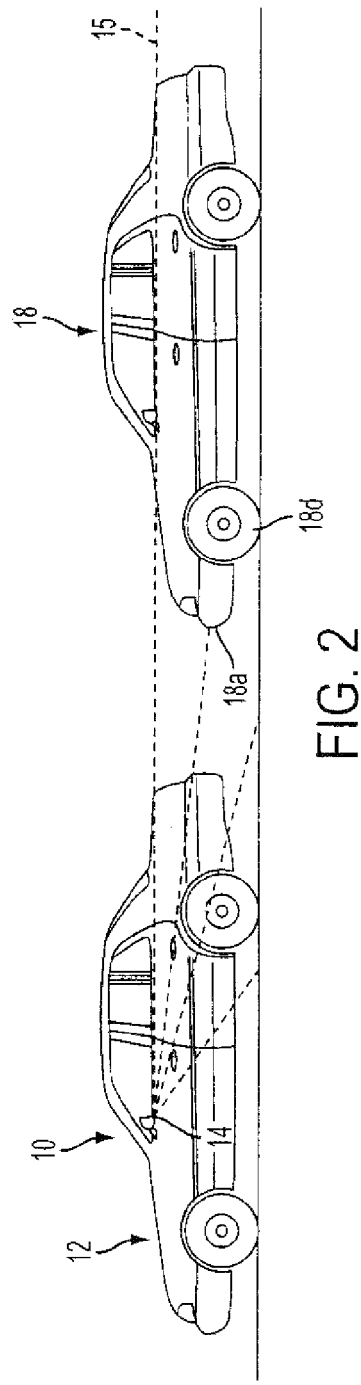
FIG. 2 is a side elevation of the vehicle of FIG. 1.
Figure 3:
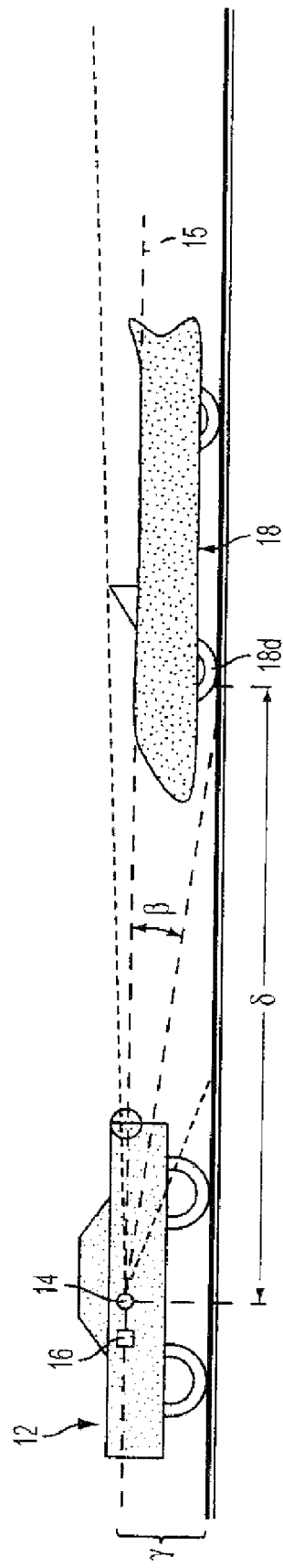
FIG. 3 is a schematic of a vehicle equipped with the lane change assist system of the present invention as the vehicle travels along a section of road.
Figure 9:
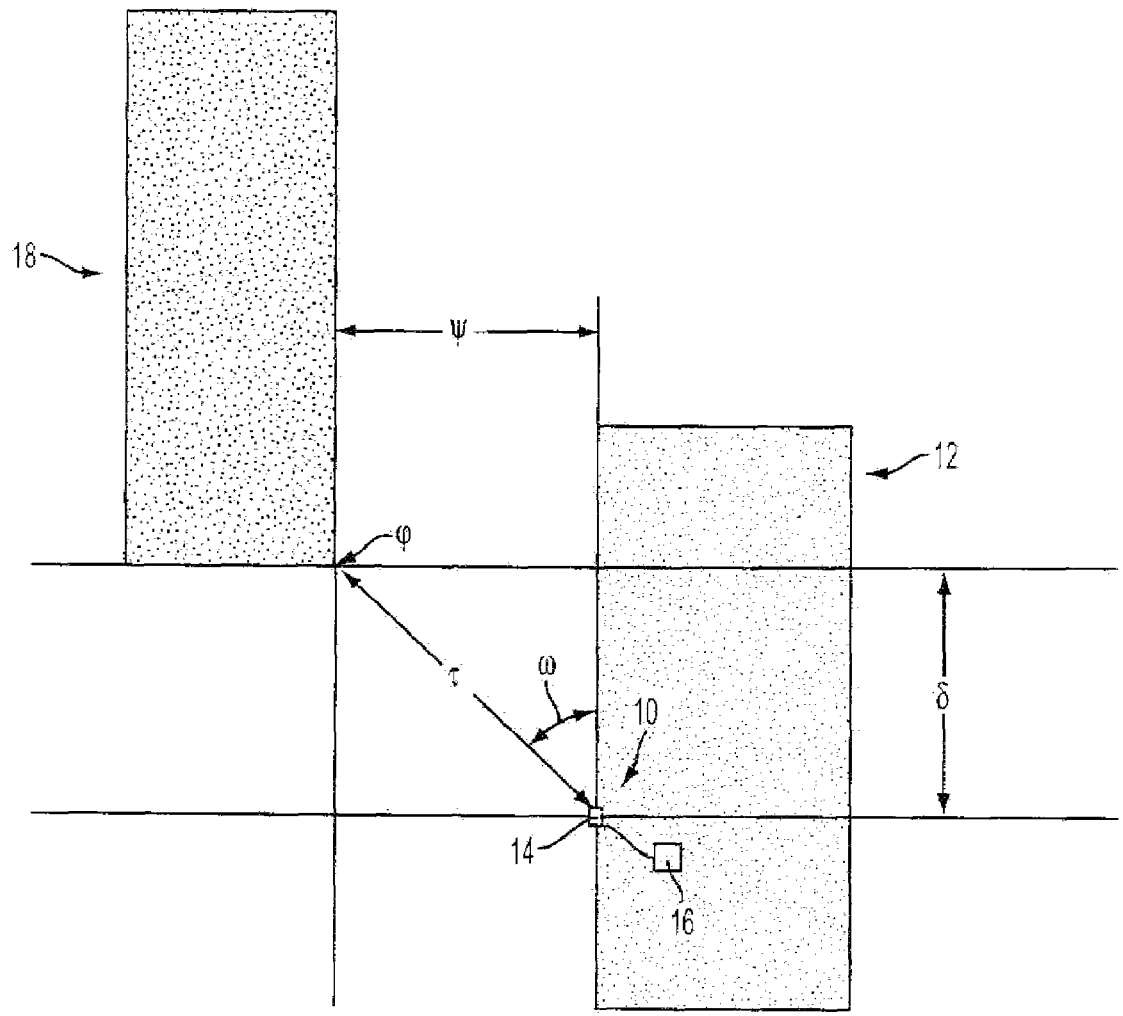
FIG. 9 is a block diagram of a top plan view of a vehicle equipped with the lane change assist system of the present invention and another vehicle as they travel along a section of road in adjacent lanes to one another.
Figure 10:
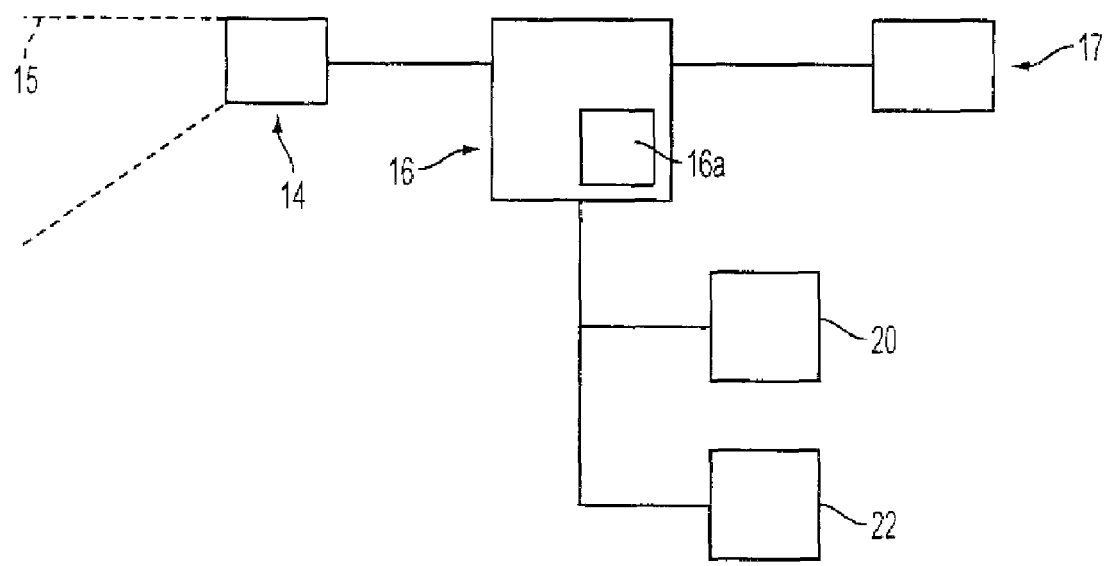
FIG. 10 is a block diagram of a lane change assist system in accordance with the present invention.

Referring now to the drawings and the illustrative embodiments depicted therein, an object detection system or imaging system, such as a lane change assist or aid system 10, is positioned at a vehicle 12 and is operable to capture an image of a scene occurring sidewardly and rearwardly at or along one or both sides of vehicle 12 (FIGS. 1-4 and 6). Lane change assist system 10 comprises an image capture device or sensor or camera 14 and a control 16 (FIGS. 3, 9 and 10). Camera 14 captures an image of the scene occurring toward a respective side of the vehicle 12, and control 16 processes the captured image to determine whether another vehicle 18 is present at the side of vehicle 12, as discussed below. Control 16 may be further operable to activate a warning indicator or display or signal device 17 (FIG. 10) to alert the driver of vehicle 12 that another vehicle is present at the side of vehicle 12. The warning or alert signal may be provided to the driver of vehicle 12 in response to another vehicle being detected at the blind spot area (as shown in FIG. 1) and may only be provided when the driver of vehicle 12 actuates a turn signal toward that side or begins turning the subject vehicle 12 toward that side to change lanes into the lane occupied by the other detected vehicle 18.

Camera or imaging sensor 14 of object detection system or lane change assist system 10 is operable to capture an image of the exterior scene within the field of view of the camera. The captured image comprises an image data set, which is representative of the exterior scene, and which is received by control 16. Control 16 is operable to process image data within a reduced data set or subset of the image data set more than other image data of the image data set to reduce the processing requirements of the control. The reduced data set or subset or subsets is/are representative of a target zone or area or areas in the exterior scene where a vehicle or other object of interest may realistically be expected to be present within the exterior scene. The control is thus operable to primarily process the significant or relevant area or areas of the scene more than less relevant areas, and may limit or reduce processing of or substantially ignore the image data representative of some areas of the exterior scene where it is not likely that a vehicle or other object of interest would be present or where a vehicle cannot be present.

Camera or imaging sensor 14 may comprise an imaging array sensor, such as a CMOS sensor or a CCD sensor or the like, such as disclosed in commonly assigned U.S. Pat. Nos. 5,550,677; 5,670,935; 5,796,094; and 6,097,023, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, which are hereby incorporated herein by reference, or an extended dynamic range camera, such as the types disclosed in U.S. provisional application Ser. No. 60/426,239, filed Nov. 14, 2002 by Bingle for CAMERA MODULE FOR VEHICLE, which is hereby incorporated herein by reference. The imaging sensor 14 may be implemented and operated in connection with other vehicular systems as well, or may be operable utilizing the principles of such other vehicular systems, such as a vehicle headlamp control system, such as the type disclosed in U.S. Pat. No. 5,796,094, which is hereby incorporated herein by reference, a rain sensor, such as the types disclosed in commonly assigned U.S. Pat. Nos. 6,353,392; 6,313,454; and/or 6,320,176, which are hereby incorporated herein by reference, a vehicle vision system, such as a forwardly or sidewardly or rearwardly directed vehicle vision system utilizing the principles disclosed in U.S. Pat. Nos.

5,550,677; 5,670,935; and 6,201,642, and/or in U.S. patent application Ser. No. 09/199,907, filed Nov. 25, 1998 by Bos et al, for WIDE ANGLE IMAGE CAPTURE SYSTEM FOR VEHICLE, now U.S. Pat. No. 6,717,610, which are hereby incorporated herein by reference, a traffic sign recognition system, a system for determining a distance to a leading vehicle or object, such as utilizing the principles disclosed in U.S. Pat. No. 6,396,397, which is hereby incorporated herein by reference, and/or the like.

Camera 14 preferably comprises a pixelated imaging array sensor which has a plurality of photon accumulating light sensors or pixels 14a. The camera includes circuitry which is operable to individually access each photosensor pixel or element of the array of photosensor pixels and to provide an output or image data set associated with the individual signals to the control 16, such as via an analog to digital converter (not shown). As camera 14 receives light from objects and/or light sources in the target scene, the control 16 may then be operable to process the signal from at least some of the pixels to analyze the image data of the captured image, as discussed below.

Camera 14 may be positioned along one or both sides of vehicle 12, such as at or within the exterior rearview mirror 12a at either or both sides of vehicle 12. However, camera 14 may be positioned elsewhere along either or both sides and/or at the rear of the vehicle and directed sidewardly and rearwardly from the vehicle to capture an image at either side of the vehicle, without affecting the scope of the present invention. Camera 14 may be positioned at vehicle 12 and oriented or angled downwardly so as to capture an image which has an upper edge or region generally at the horizon 15, as can be seen with reference to FIGS. 2, 3 and 11C. Positioning or orienting the camera 14 in such a manner provides for an increased horizontal pixel count across the captured image at the important areas along the side of vehicle 12, since any vehicle or significant object positioned at or along a side of the subject vehicle will be substantially below the horizon and thus substantially within the captured image. The lane change assist system of the present invention thus may provide an increased portion of the captured image or increased pixel count at important or significant or relevant areas of the exterior scene, since the area well above the road or horizon is not as significant to the detection of a vehicle at or along a side of the subject vehicle. Additionally, positioning the camera to be angled generally downwardly also reduces the adverse effects that the sun and/or headlamps of other vehicles may have on the captured images. Camera 14 thus may be operable to capture substantially an entire image of the sideward scene below the horizon.

Control 16 is responsive to camera 14 and processes the signals received from at least some of the pixels of camera 14 to determine what is in the captured image. The present invention utilizes physical characteristics of vehicles and roads to reduce or filter out or substantially eliminate the signals from some of the pixels and to reduce or eliminate signals or detected images indicative of certain insignificant or unimportant objects detected within the captured image, as discussed below. For example, control 16 may primarily process the image data from pixels of camera 14 that are within a reduced data set or subset of the image data of the captured image. The reduced data set of the captured image may be representative of a targeted area or zone of interest of the exterior scene being captured by the camera. The targeted zone may be selected because it encompasses a geographic area of the exterior scene where a vehicle or other object of interest is likely to be present, while the other image data or areas or portions of the captured image may be representative of areas in the exterior scene where a vehicle or other object of interest is unlikely to be present or cannot be present, as discussed below. The present invention thus may provide for a quicker response time by control 16, since the control 16 does not continually process the signals from substantially all of the pixels 14a of camera 14. Preferably, less than approximately 75% of the image data captured by the camera is utilized for object detection, more preferably, less than approximately 66% of the captured image data is utilized for object detection, and most preferably, less than approximately 50% of the captured image data is utilized for object detection.

Control 16 may include a microprocessor having an edge detection algorithm or function 16a (FIG. 10) which is operable to process or is applied to the image data received from the individual pixels to determine whether the image captured by the pixels defines an edge or edges of a significant object, such as an edge or edges associated with or indicative of a bumper 18a of a vehicle 18 or the like. The edge detection function or algorithm 16a of control 16 allows lane change assist system 10 to interrogate complex patterns in the captured image and separate out particular patterns or edges which may be indicative of a vehicle in the adjacent lane, and to substantially ignore or limit processing of other edges or patterns which are not or cannot be indicative of a vehicle and thus are insignificant to lane change assist system 10. Other information or image data in the captured image or frame which is not associated with edges or which is not associated with significant edges (e.g. edges indicative of a portion of a vehicle), may then be substantially ignored or filtered out by control 16 via various filtering processes or mechanisms discussed below to reduce the information or image data being processed by control 16 and to reduce the possibility of a false positive detection by control 16. The edge detection function or algorithm 16a may comprise a Sobel gradient edge detection algorithm or other edge detection algorithms commercially available, and such as disclosed in U.S. Pat. Nos. 6,353,392 and 6,313,454, which are hereby incorporated herein by reference.

Control 16 may be operable to determine which edges detected are horizontal or generally horizontal edges and to limit processing of or to partially filter out or substantially ignore vertical edges. This may be preferred, since many edges in a vehicle in an adjacent lane will be horizontal or parallel to the road surface, such as edges associated with bumper lines, grills, fenders, and/or the like. Control 16 may thus reject or substantially ignore edges which are non-horizontal, thereby reducing the data to be processed. The edge detection algorithm 16a may also provide digital polarization of the captured images to determine horizontal gradients and to substantially ignore the effects of vertical gradients of the detected edges. For example, the edge detection algorithm may use a convolution matrix (such as a one by three matrix or other small matrix or array) which may be processed or applied to the image data in a single pass across the data received from the pixels 14a of the camera 14 to provide horizontally polarized edge detection through the captured image or a portion thereof. Such horizontal polarization greatly reduces the possibility that road signs and/or guardrails and/or the like will be processed and analyzed by the control of the lane change assist system of the present invention, thereby reducing the processing requirements and reducing the possibility of a false positive signal by the control.

Additionally, the edge detection algorithm 16a of control 16 may function to detect and determine if there is more than one vehicle present at the side of the subject vehicle 12. For example, control 16 may distinguish between edges constituting the fronts of different vehicles and edges constituting the front and side of the same vehicle, since the vehicle fronts typically will have more horizontal edges than the vehicle sides.

In order to further reduce the processing requirements and the possibility of a false positive indication, and thus enhance the response time and system performance, control 16 may process signals or image data from pixels that are oriented or targeted or arranged or selected to capture images of objects or items that are at least partially positioned within a predetermined or targeted area or zone of interest. The zone of interest may be defined by an area or region at the side of the subject vehicle where another vehicle or significant object may be positioned, such as in the blind spot region of that side of the vehicle, which would be significant or important to lane change assist system 10. For example, the zone of interest or "polygon of interest" may be directed rearward from the camera and toward or around the center of the adjacent lane. By substantially isolating the zone of interest, or substantially filtering out or substantially ignoring or reducing utilization of edges or signals or image data of the captured image which are representative of areas outside of the zone or area of interest, the system of the present invention may reduce the image data or information to be processed by control 16 and may substantially reduce the possibility that a false positive signal will occur. For example, if an object is detected substantially to one side or the other or substantially at the bottom of the captured image, such an object is not likely to be a vehicle positioned within the blind spot area of the subject vehicle 12, whereby control 16 may reduce processing of or may not process image data from the pixels capturing that area of the scene or may substantially ignore such a detected edge or object in subsequent processing of the image data captured by the pixels 14*a* of camera 14.

It is further envisioned that control 16 may process the image data of pixels capturing images representative of an area within the zone of interest and may not indicate a positive signal of a vehicle or other significant object in the adjacent lane unless a detected edge within the reduced image data set or subset or zone of interest is greater than a minimum size threshold, or spans a threshold number of pixels. Optionally, control 16 may require that a detected edge span or include a threshold number of pixels that are within a predetermined "hot zone" or specific targeted area within the zone of interest before the edge will be considered significant for further processing. The targeted zone or hot zone may be defined as a reduced zone or area near the center of the zone of interest or targeted road space or adjacent lane. The control 16 thus may require a substantial portion of the detected edge or edges to be within the smaller hot zone before the control may consider the edges to constitute a portion of a vehicle in the adjacent lane or other significant object. This also may substantially reduce the processing requirements and may substantially reduce the possibility of a false positive signal being generated by control 16.

The reduced image data set of the captured image which is representative of the zone of interest of the exterior scene may be adjusted by control 16 in response to various road or driving conditions, lighting conditions, and/or characteristics of the detected edges or objects. The reduced data set or zone of interest thus may be adaptable to various conditions encountered by the vehicle, such that the control may further reduce the processing requirements and enhance the efficiency of the system by primarily processing image data from some pixels and ignoring image data from other pixels depending on the present conditions surrounding the vehicle.

Figure 4:
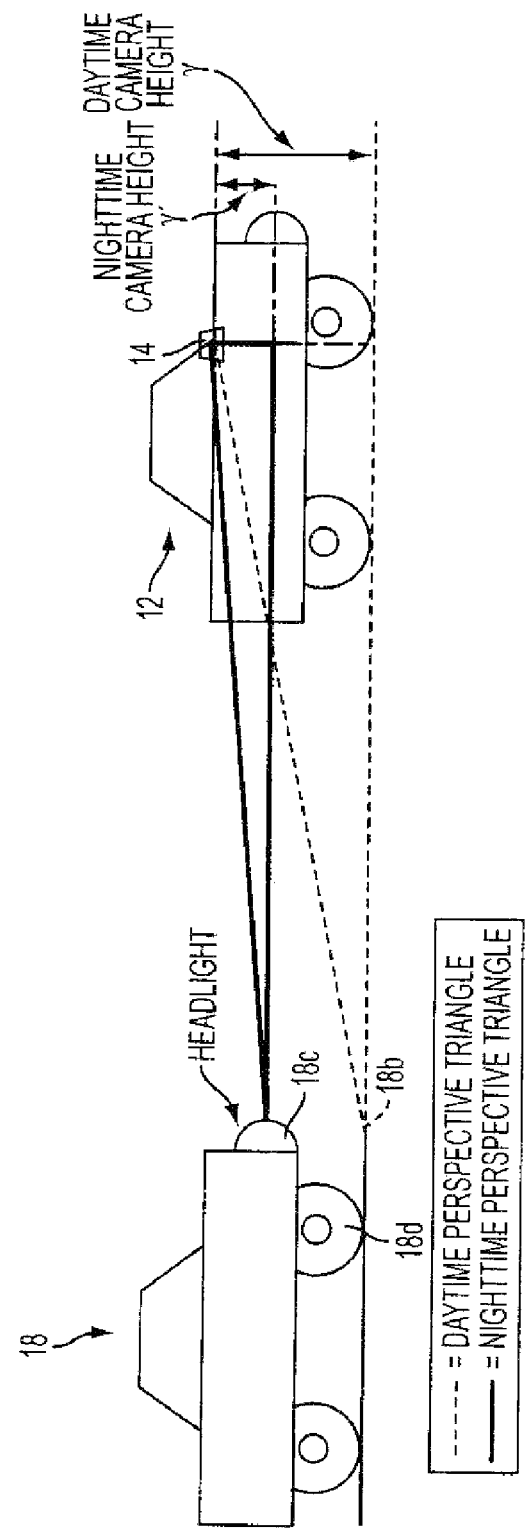
FIG. 4 is another schematic of the vehicle and depicts how the lane change assist system of the present invention adapts between daytime and nighttime driving conditions.

For example, as shown in FIG. 4, control 16 may be operable to adjust or adapt the image data subset or zone or area of interest between daytime and nighttime driving conditions. During daytime driving conditions, detecting the edge of the front horizontal shadow 18*b* (FIG. 4) of a vehicle 18 or the bumper 18*b* of a vehicle 18 may be the method for significant object or vehicle detection by the lane change assist system of the present invention. However, during nighttime driving conditions, where such vehicle characteristics may not be visible to the camera 14, the primary detection characteristic may be the headlights 18*c* of a vehicle 18 approaching from the rear of the subject vehicle. Control 16 may thus adjust or adapt the reduced data set or target zone in response to an output or signal from an ambient light sensor (which detects the ambient light intensity present at or around the subject vehicle), a headlamp control, a headlamp switch, a manual control or input and/or the like (shown generally at 20 in FIG. 10). More particularly, the reduced data set or zone of interest may be raised to correspond to the typical height or range of height of a headlight of a typical vehicle, so that control 16 may primarily process image data from pixels which receive light from headlamps of vehicles in the adjacent lane.

As shown in FIG. 4, the adjustment of the reduced data set or zone may be adjusted mathematically by changing the height ($\gamma$, $\gamma'$) of the camera as input to the control (such as between a daytime camera height shown generally at $\gamma$ and a nighttime camera height shown generally at $\gamma'$), such that all of the geometry of the zone of interest is adjusted upward. Because headlights of vehicles are generally within a certain distance or range above the road surface, the control may be operable to adjust the reduced data set or zone of interest to adapt to this geometric change in the detection characteristic. A daytime perspective triangle associated with the camera is shown generally at D in FIG. 4, while a nighttime perspective triangle associated with the camera is shown generally at N in FIG. 4.

Figure 6:
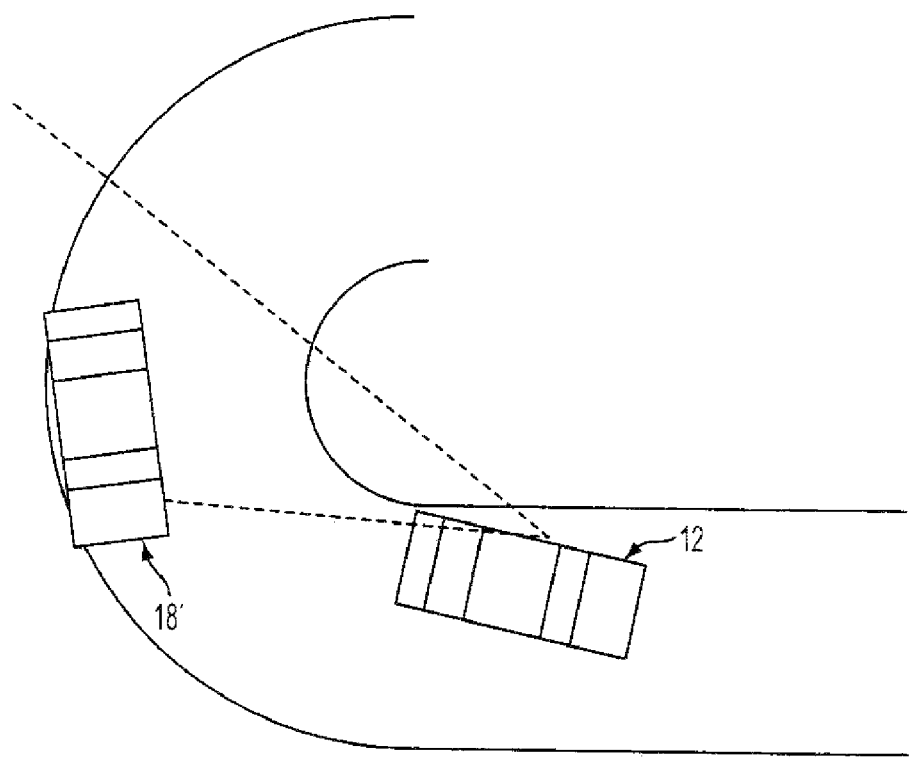
FIG. 6 is a top plan view of a vehicle equipped with the lane change assist system of the present invention, as the vehicle travels around a sharp curve in a section of road.
Figure 7:
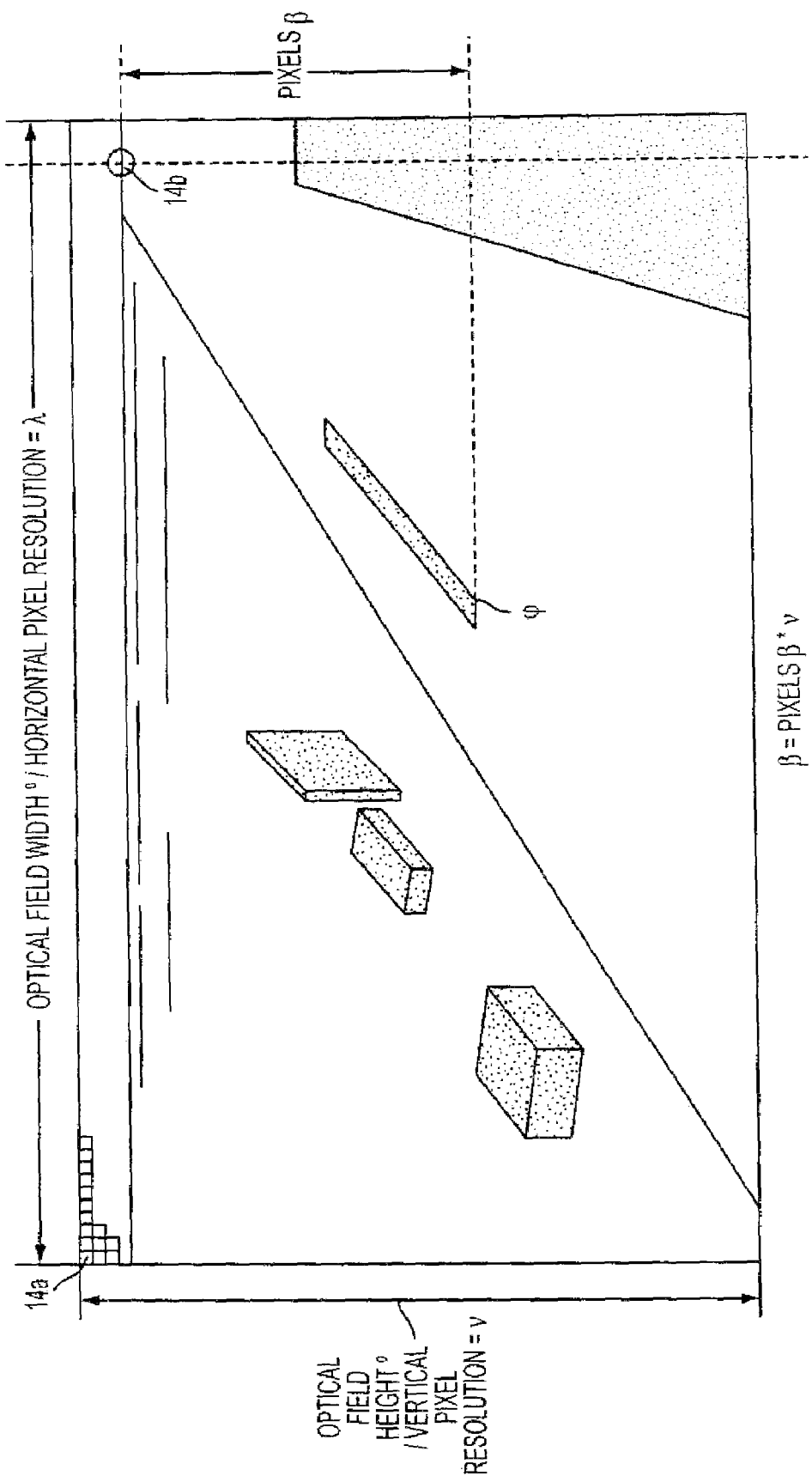
FIG. 7 is a schematic of a pixelated image as may be captured by a camera or image sensor of a lane change assist system in accordance with the present invention.
Figure 8:
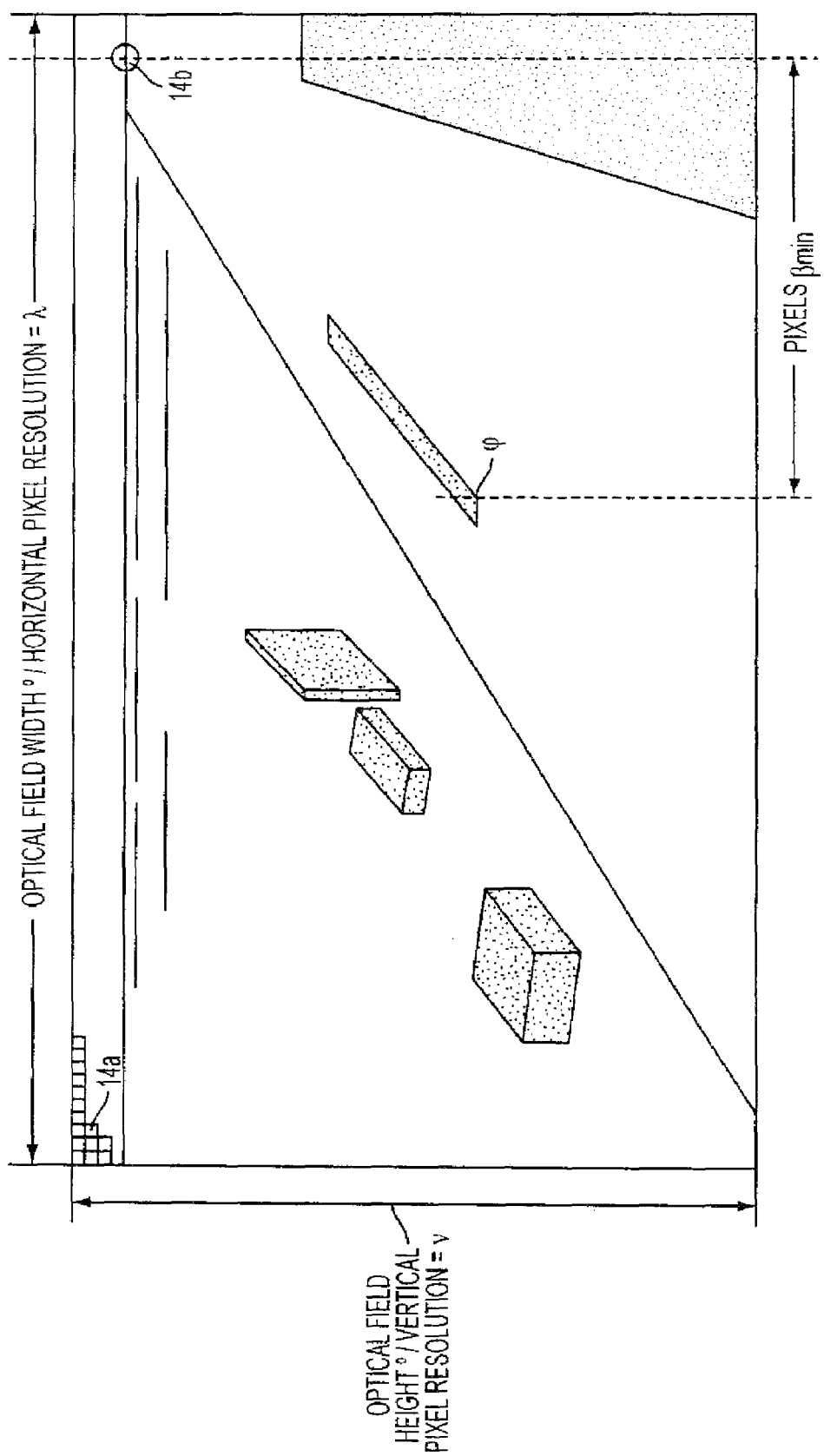
FIG. 8 is a schematic of another pixelated image similar to FIG. 7.

It is further envisioned that the reduced data set or area or zone of interest may be changed or adapted to accommodate sharp curves in the road that the subject vehicle 12 is traveling through or has traveled through. In situations where a vehicle travels along a sharp curve in the road, a lane change assist system may consider a guardrail or vehicle 18' in another lane to be a vehicle or object of interest in the adjacent lane, since the other vehicle or object may be positioned generally at or near the zone of interest of the lane change assist system, as can be seen in FIG. 6. Control 16 may be operable to process the image data or signals from the pixels 14*a* of camera 14 to determine lane markers along the road, or a shoulder of the road or the like, in order to determine the road curvature as the vehicle 12 travels along the section of road. In situations where a sharp curve in the road is detected, control 16 may be operable to alter or reshape the reduced data set or area or zone of interest and/or to adjust the distance thresholds (discussed below) or to adjust other filtering characteristics or criteria or thresholds to accommodate such a curve in the road. The lane change assist system of the present invention thus may use road curvature information to adjust how far back and/or where the camera and/or control may look for significant objects or vehicles. The lane change assist system thus substantially avoids providing a false positive signal upon detection of another vehicle 18' or guardrail or the like which is not in the adjacent lane, since such a vehicle or object may not be within the adjusted zone of interest of the lane change assist system.

Optionally, control 16 may be further operable to substantially eliminate or substantially ignore image data representative of objects or edges which are too large or too small to be considered part of a vehicle in the adjacent lane. If a detected edge is too small, such as if the horizontal pixel span or vertical pixel span is very small, the control may reduce processing of the edge or the edge may be removed from further processing, since it does not represent a significant edge to the lane change assist system 10. Likewise, if an edge is too large, the control may reduce processing of the edge or it may also be removed from further processing since it does not represent a vehicle in the adjacent lane. The threshold size of the detected edge or object may also vary in response to the distance to the edge or object, as discussed below.

Additionally, lane change assist system 10 may be operable to determine whether a detected edge or object is a vehicle in an adjacent lane in response to one or more other detection thresholds or criteria. Further, control 16 may be operable to vary one or more detection thresholds or criteria at which a detected edge or object is considered a vehicle or significant object. The threshold values may thus be variable and may be adjusted in response to driving conditions, road curvature, location of the detected edges and/or the distance between the camera and the detected object and/or the like. For example, the threshold value or values may be adjusted in response to the distance so that control 16 more readily accepts and processes detected edges as the object they are representative of gets closer to or approaches the subject vehicle.

For example, control 16 may have a minimum gradient threshold at which control 16 determines whether or not a detected edge is to be included in further processing of the captured image. Control 16 thus may be operable to determine the vertical and/or horizontal gradient of the detected edges and may substantially eliminate or filter out edges with a gradient below a threshold gradient level, since such edges cannot be representative of a vehicle or object which is significant to the lane change assist system. The control thus may further substantially preclude false positive signals and reduce further processing of the pixel signals.

However, as an object or other vehicle approaches the subject vehicle 12, the detected edge or edges representative of the object tends to resolve or reduces and spreads out the gradient across multiple pixels, thereby reducing the gradient at a particular pixel. Control 16 thus may be further operable to adjust the minimum gradient threshold in response to the distance to the detected object. By using a calculated or estimated or approximated distance to the detected object or a table of perspective calculations or distance approximations, discussed below, the minimum gradient threshold may be reduced proportionally in response to the estimated or tabulated distance data to provide enhanced edge detection at closer ranges.

By detecting edges of objects within the reduced data set or zone or area of interest (and adjusting the zone of interest for particular driving conditions or situations), and by focusing on or concentrating on or primarily processing the horizontal edges detected or other edges which may be indicative of a vehicle or significant object, while substantially filtering out or substantially ignoring other image data or edges or information, the present invention substantially reduces the possibility of false positive signals. In order to further reduce the possibility of such false positive signals, control 16 may be operable to determine a distance between a detected object and the subject vehicle to further filter out or substantially eliminate objects that are not within a predetermined range or threshold distance from the subject vehicle and which, thus, may be insignificant to the lane change assist system of the present invention.

In a preferred embodiment, camera 14 and control 16 may be operable to approximate the distance to an object or vehicle in response to a pixel count of the number of pixels between the pixels capturing the object (or an edge of the object) and the pixels along an edge of the camera or directed toward and along the horizon of the captured image. More particularly, with the camera 14 oriented with the video frame horizontal scan lines or pixels being generally parallel to the horizon, perspective calculations may be made to provide a table of entries of particular distances which correspond to particular horizontal lines or pixels in the video frame which may detect or sense a forward edge of an adjacent vehicle at the ground level, such as an edge corresponding to a shadow of the front of the vehicle 18 or an edge corresponding to the intersection of the tire 18*d* of the vehicle 18 on the road surface or the like. The distance to an object captured by an edge detected in the captured image may then be approximated by determining a vertical pixel count and retrieving the appropriate distance entry corresponding to that particular horizontal line or pixel count or position. The present invention thus provides for a quick and inexpensive means for determining or estimating or approximating the distance between the subject vehicle and an object or edge detected in the area or zone of interest by determining a horizontal line count from the horizon down to the pixels capturing the detected edge.

As can be seen with reference to FIGS. 3 and 7-9 and as discussed below, the location and distance of a closest point $\phi$ on a detected edge or object relative to camera 14 or subject vehicle 12 may be calculated based on known or assigned parameters of the location of camera 14 and a horizontal and vertical pixel count between a target or alignment point 14*b* (FIGS. 7 and 8) and the closest point $\phi$. This may be accomplished because the lowest detected edge of a vehicle may be considered to be indicative of a forward shadow of the front bumper of the vehicle on the road surface or may be indicative of the intersection of the tire and the road surface. Because such edges are generally at or near the road surface, the distance to the detected object may be calculated using known geometrical equations given the height of the camera on the subject vehicle (as input to the control). Control 16 thus may quickly determine the distance to a detected object and may be easily calibrated for different applications of the lane change assist system. The calculated distances corresponding to at least some of the pixels 14*a* of camera 14 may be entered into a table or database, such that control 16 may be operable to quickly obtain an estimated distance between the camera and the closest point of a detected edge or object once at least the vertical pixel count between the closest point $\phi$ and the horizon or target or alignment point 14*b* is determined.

More particularly, in order to determine the total distance between camera 14 and the closest point of a detected edge or object, the lateral distance $\psi$ and longitudinal distance $\delta$ may be calculated and used to obtain the total distance $\tau$. Because the lateral distance $\psi$ should be approximately constant for an edge or vehicle detected in the zone or area corresponding to the adjacent lane, the lane change assist system 10 may only calculate or tabulate and access the longitudinal distance $\delta$ for the detected edges, whereby the distances may be calculated and tabulated for each horizontal line count down from the horizon or target point. More particularly, the longitudinal distance $\delta$ may be calculated or approximated by determining a pixel count (Pixels$_\beta$) downward from the horizon 15 to the detected edge or point $\phi$. The pixel count may be used to obtain a value for the downward angle $\beta$ (FIG. 3) between camera 14 and the detected object, which is derived from the following equation (1):

$$\beta = \text{Pixels}_\beta * \nu; \quad (1)$$

where v is the vertical view angle per pixel of the camera and is obtained via the following equation (2):

$$v = (\text{Optical Field Height Degrees})/(\text{Vertical Pixel Resolution}); \quad (2)$$

where the Optical Field Height Degrees is the vertical angle of view of the camera and the Vertical Pixel Resolution is the number of horizontal rows of pixels of the camera. The downward angle β is then calculated to determine the angle between the horizon and the forward edge of the detected object at the ground. The longitudinal distance δ between the vehicles may then be determined or approximated by the following equation (3):

$$\delta = \gamma * \tan(90° - \beta); \quad (3)$$

where γ is the height of the camera 14 above the ground as input to the control 16, and as best shown with reference to FIG. 3. As discussed above, the height input to control 16 may be adjusted between γ and γ' (FIG. 4) to adjust the zone of interest for daytime versus nighttime driving conditions. Such an adjustment also adjusts the distance calculations to determine the distance to the detected headlamps, which are above the ground or road surface.

Likewise, if desired, the lateral or sideward location or distance ψ to the closest point φ on the detected edge or object may be calculated by obtaining a horizontal pixel count Pixel$_{\beta min}$, such as by counting or determining the pixels or pixel columns from the alignment point 14b horizontally across the captured image to the pixel column corresponding to the closest point φ. This pixel count value may be used to calculate the lateral distance to the detected edge or object, which may in turn be used to calculate or estimate the total distance to the detected object. More particularly, the lateral angle ω (FIG. 9) between camera 14 at the side of vehicle 12 and the detected object may be determined by the following equation (4):

$$\omega = \text{Pixel}_{\beta min} * \lambda; \quad (4)$$

where λ is the horizontal view angle per pixel of the camera and is obtained via the following equation (5):

$$\lambda = \text{Optical Field Width Degrees}/\text{Horizontal Pixel Resolution}; \quad (5)$$

where the Optical Field Width Degrees of camera 14 is the angle of view of the camera and the Horizontal Pixel Resolution is the number of columns of pixels of camera 14.

Optionally, the lateral angle ω (FIG. 9) between camera 14 at the side of vehicle 12 and the detected object may be determined using spherical trigonometry, which may provide a more accurate lateral angle ω determination than equations 4 and 5 above. Using spherical trigonometry, discussed below, or the equations set forth above, a table (image space) of horizontal angles may be produced at initialization or startup of the lane change assist system 10 to determine the horizontal angle for each pixel position on the captured image. Because the horizontal angle is not independent of the vertical angle, an image space may be created and the horizontal view angle of every pixel may be stored therein. An example of such an image space or array is depicted in FIG. 11F.

In determining the perspective geometry, the parameters of a virtual camera 14' are determined or assigned and implemented (see FIGS. 11A-11E). The virtual camera 14' does not actually exist, but calculations may be made to determine an effective focal length (in pixels) of the virtual camera. To work with the perspective geometry, spherical trigonometry may be employed to determine where each pixel on the camera is directed toward. In spherical trigonometry, lateral angles may be calculated based on both horizontal and vertical pixel positions of the detected edge grouping or point. The relationship between horizontal angles and vertical angles may be used to calculate or generate a table of horizontal angles and/or distances to an edge or object detected by each pixel.

The virtual camera geometry may be calculated and used to determine the relationship between each pixel of the captured image and the location on the road surface that the pixel corresponds to. These calculations may be based on an assumption that lines perpendicular to the direction of travel of the subject vehicle may be on a plane which is generally parallel to the horizon and, thus, parallel to the image or pixel lines or rows, since the camera is positioned or oriented such that the horizontal rows of pixels are generally parallel to the horizon. This allows the control to determine the distance along the vehicle forward direction in response to the row of pixels on which the object has been detected, assuming that the camera is detecting an edge of the detected object or other vehicle (such as the front shadow edges, tires or the like) along the pavement or road surface.

Figure 11A:
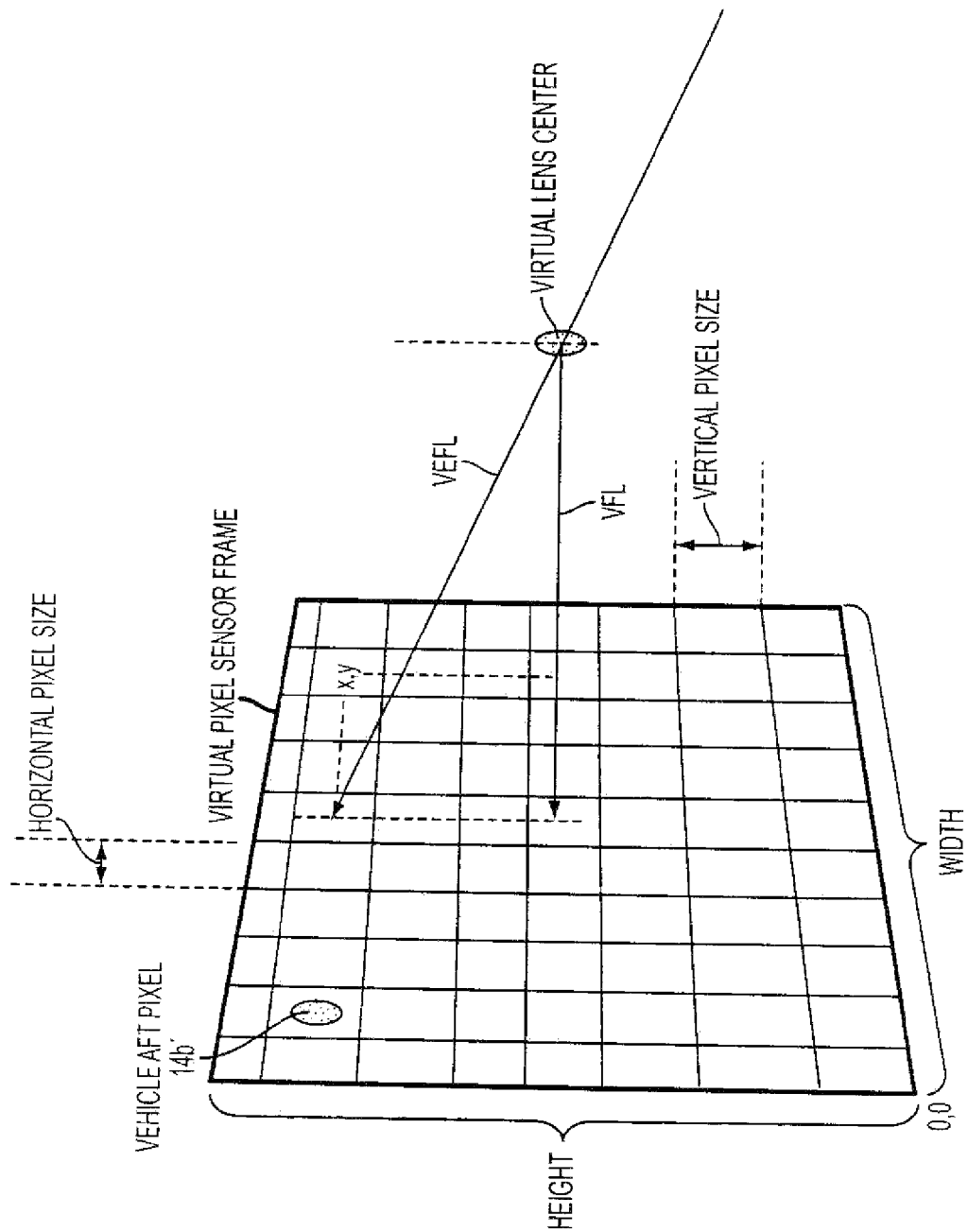
Figure 11B:
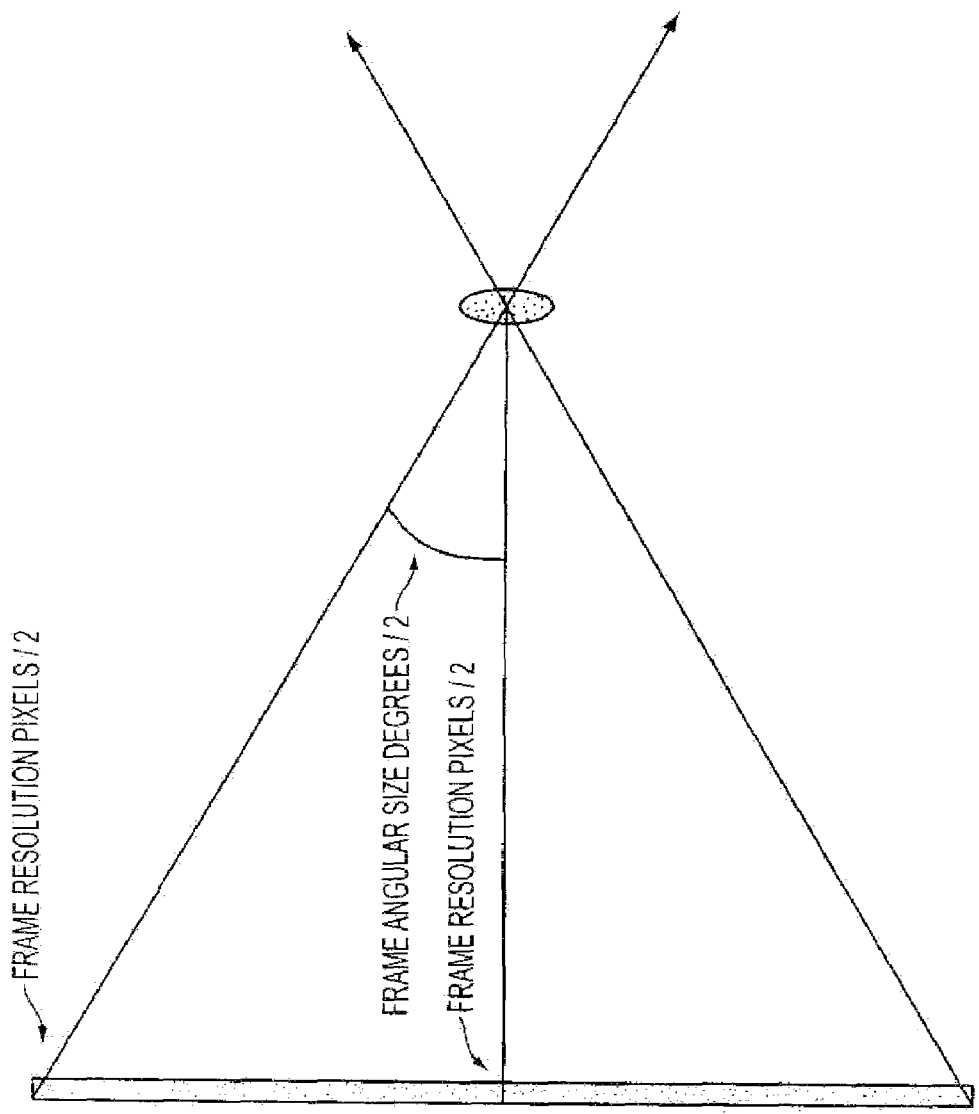
Figure 11D:
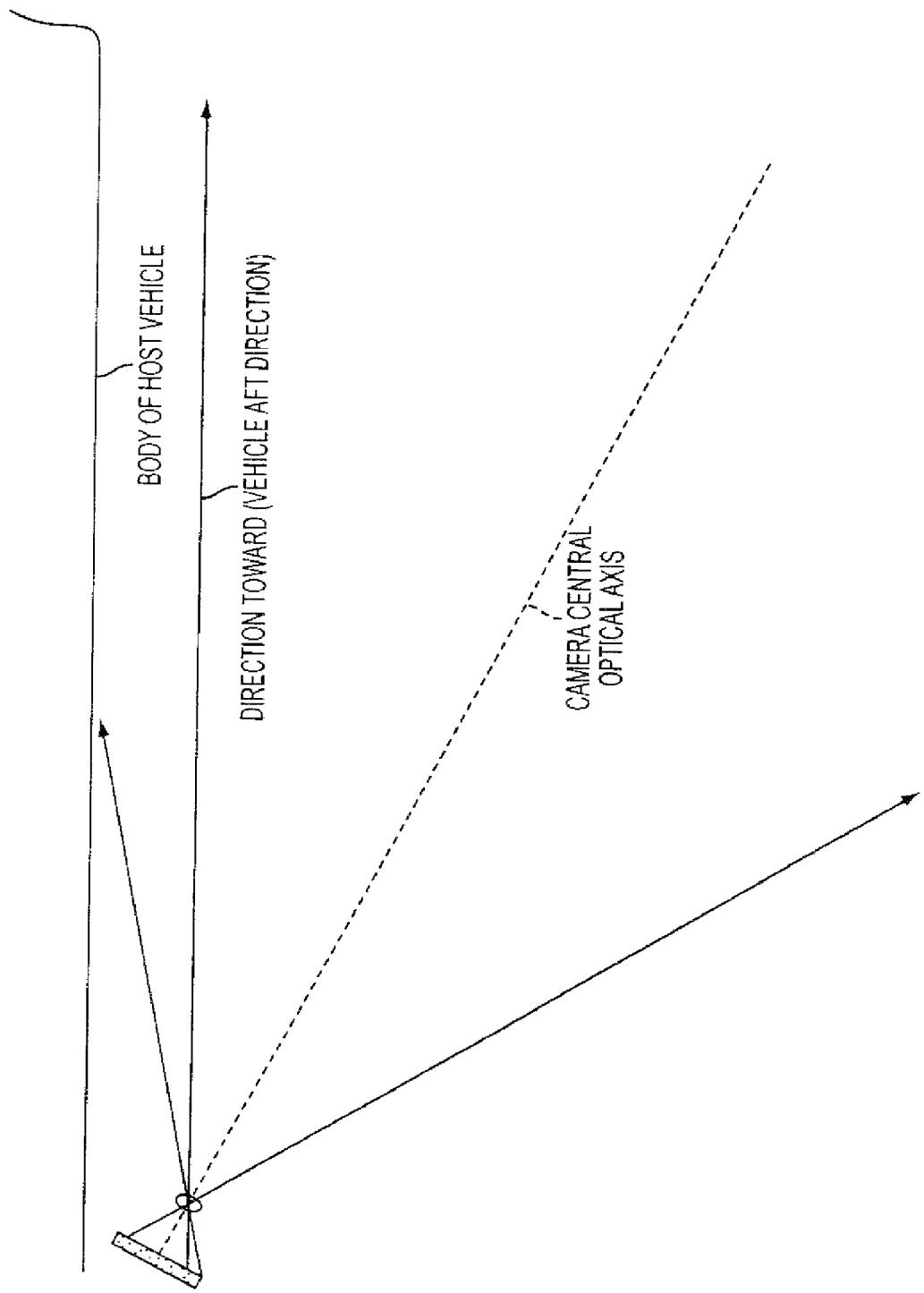
Figure 11E:
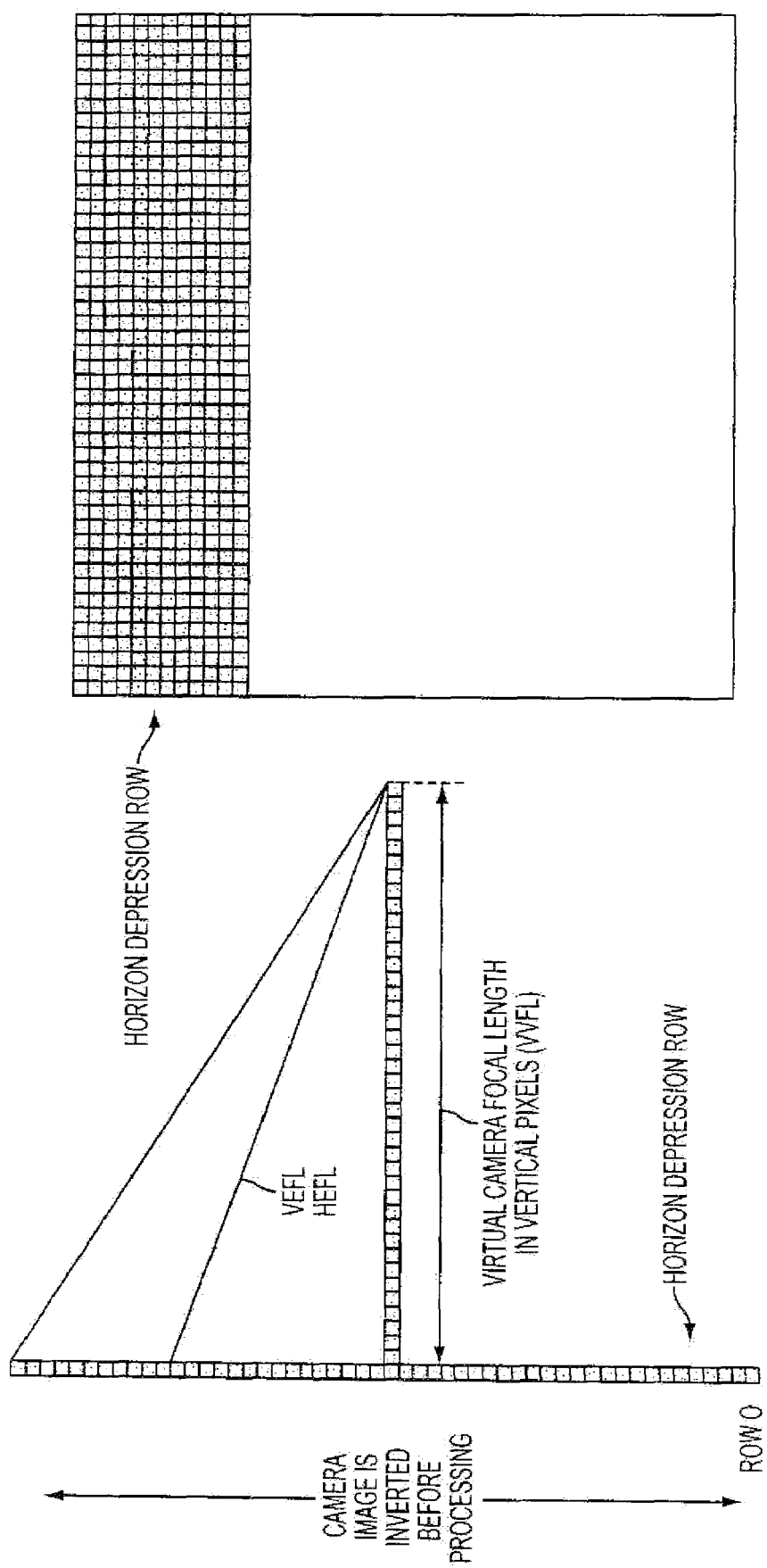

An array of pixels 14a' and a focal length (in pixels) vfl of the virtual camera 14' is shown in FIGS. 11A, 11B and 11E. The virtual focal length vfl at the frame center of the virtual camera 14' may be determined by the following equation (6):

$$vfl = (\text{Pixel Resolution}/2)/(\tan(\text{Frame Angular Size}/2)); \quad (6)$$

where the Frame Angular Size is the angular field of view of the camera 14. This equation may be used to calculate the virtual focal length of an imaginary pinhole camera with an infinitely small pinhole lens in vertical pixels vvfl and the virtual focal length in horizontal pixels hvfl using the pixel resolutions and frame angular sizes in the vertical and horizontal directions, respectively. The virtual focal length is calculated in both vertical pixel units and horizontal pixel units because the vertical and horizontal sizes of the pixels may be different and the camera may have a different pixel resolution and frame angular size or field of view between the vertical and horizontal directions.

The vertical or downward view angle β to the object may be determined by the following equation (7):

$$\beta = \arctan(\text{Vertical Pixels})/(vvfl); \quad (7)$$

where Vertical Pixels is the number of pixels or rows of pixels down from the target row or horizon. The view angle thus may be calculated for any line of pixels according to equation (7). An array for each of the view angle values may be calculated and stored for rapid distance calculations. The downward angle β may then be used to calculate the longitudinal distance δ in a similar manner as discussed above. As discussed above, the longitudinal distance calculations assume that for a detected edge or object along a row of pixels, the longitudinal distance to the edge or object is the same for any pixel along the row, since the camera is oriented with the rows of pixels being generally parallel to the horizon and generally perpendicular to the direction of travel of the vehicle.

In order to determine the location and angle and distance to a detected object or edge (which may be represented by a point along an object, such as at coordinate x, y of the pixel array (FIG. 11A)), the effective focal length of the virtual camera for the point on the detected object may be calculated. As shown in FIG. 11E, the effective focal length in vertical pixels (vefl) may be calculated by the following equation (8):

$$vefl = (vvfl^2 + (y - height/2)^2)^{1/2}; \quad (8)$$

where height/2 is one-half of the vertical image height (in pixels) of the camera. The effective focal length in horizontal pixels (hefl) may then be calculated by converting the effective focal length in vertical pixel units to horizontal pixel units via the following equation (9):

$$hefl = hvfl * vefl / vvfl. \quad (9)$$

The horizontal angle ω to the detected point in the image may be calculated via the following equation (10):

$$\omega = \arctan(\text{Horizontal Pixels}/hefl); \quad (10)$$

where Horizontal Pixels is the number of columns of pixels (or horizontal distance in pixels) that the point x, y is from the target or alignment or aft point or pixel. The Horizontal Pixels value may be counted or calculated by the control. The calculations for the Horizontal Pixels value may be different for the opposite sides of the vehicle in applications where the zero coordinate of the pixel array may be on the vehicle side of the array for a camera on one side of the vehicle, such as on the passenger side of the vehicle, and may be on the outside of the array for a camera on the other side of the vehicle, such as on the driver side of the vehicle. In the illustrated embodiment of FIG. 11A, the Horizontal Pixels may be calculated by subtracting the x-coordinate for the aft pixel or alignment point 14b' from the x-coordinate of the detected point x, y.

Such calculations may provide a more precise and true value for the lateral angle ω between the camera 14 and the detected object. The lateral distance ψ to the detected object may thus be calculated by the following equation (11):

$$\psi = \delta * \tan(\omega). \quad (11)$$

Accordingly, the actual distance τ between camera 14 and the closest point on the detected object may be obtained by the following equation (12):

$$\tau = (\delta^2 + \psi^2)^{1/2}. \quad (12)$$

Because the lateral, longitudinal and total distances are calculated using certain known or obtainable characteristics and geometrical relationships, such as the input height of camera 14 above the ground, the pixel resolution of camera 14, the field of view of the camera, and a pixel count in the horizontal and vertical direction with respect to a target point or alignment target and/or the horizon, the calculated distance and/or angle values for each pixel count or location may be entered into a table to provide a rapid response time for determining the distance to the detected edge or object once the pixel count or location of the detected edge is known.

As discussed above, the lane change assist system may only be concerned with the longitudinal distance δ to the detected edge. Control 16 may thus determine a vertical pixel count and approximate the longitudinal distance to the detected object or edge via equations (1), (2) and (3) or via the data table, thereby significantly reducing the processing requirements of control 16 to estimate or calculate the distance to the detected edges or objects.

Figure 5:
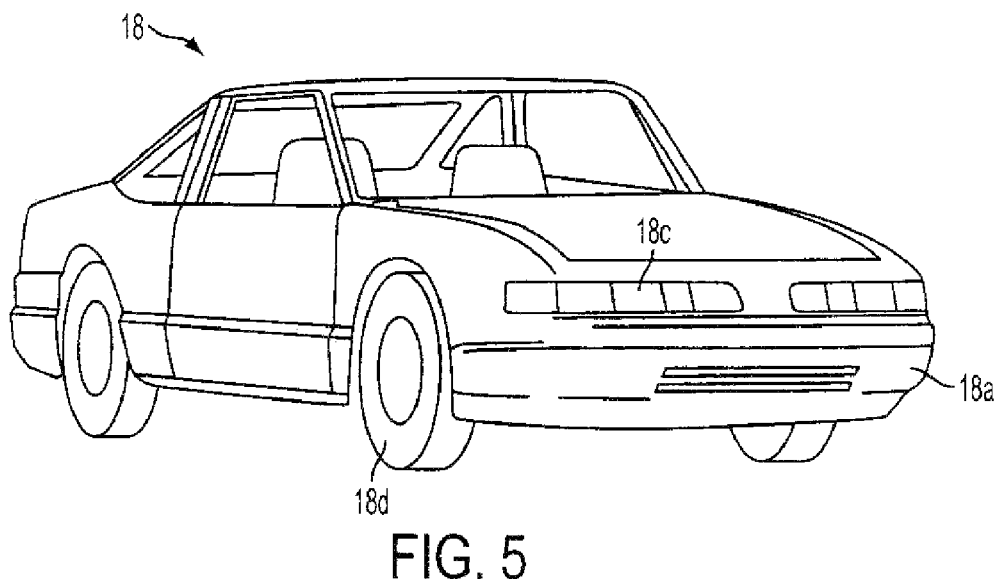
FIG. 5 is a perspective view of a vehicle as it may be viewed by a camera or image sensor of the lane change assist system of the present invention.

Additionally, control 16 may be operable to substantially eliminate or substantially ignore other forms or types of detected edges which are not likely or cannot be part of a vehicle in the adjacent lane. For example, as can be seen in FIG. 5, the tires and wheels 18d of an adjacent or approaching vehicle 18 are viewed as ellipses from a forward and sideward angle with respect to the adjacent vehicle. Because all vehicles on the road have tires, control 16 of lane change assist system 10 may be operable to process the signals from the pixels (such as the pixels directed toward the zone of interest) to detect the presence of one or more ellipses at or near the detected edges. If an ellipse or wheel is not detected, then the detected edges and associated object may be eliminated from processing by control 16, since it cannot be a vehicle in the adjacent lane. Detecting the presence of ellipses and wheels or portions thereof can thus assist in providing information regarding the existence of a vehicle and may assist in determining the position and/or velocity or relative position and/or relative velocity of the detected vehicle with respect to vehicle 12.

In order to further reduce the possibility of control 16 generating a false positive signal, control 16 of lane change assist system 10 may be operable to determine an intensity or brightness level associated with the detected edges and to substantially eliminate edges which do not significantly change in brightness level or intensity level from one side of the detected edge to the other. This is preferred, since lines in the road, thin branches on the road and/or many other small articles or objects may not resolve, and thus may result in single edges that do not significantly change in brightness or intensity (or color if a color system is used) across their detected edges. However, a significant change in brightness or intensity would be expected along a detected edge of an automotive body panel or bumper or other component or structure of a vehicle or the like. Accordingly, control 16 may substantially eliminate or substantially ignore edges or objects which do not have a significant brightness or intensity change thereacross, since an edge with an insignificant change in brightness or color signifies an insignificant edge which can be substantially eliminated. By substantially eliminating such insignificant edges, control 16 may further significantly reduce the computational requirements or processing requirements, while also significantly reducing the possibility of a false positive indication.

Control 16 may also be operable to compare image data from consecutive frames or images captured by camera 14 to confirm that a detected edge or object is representative of a vehicle in an adjacent lane and/or to determine the relative speed between the detected object or vehicle and the equipped or subject vehicle 12. By extracting collections of edges or points of interest, such as ellipses, bend maximums in edges and/or the like, from consecutive frames, and correlating such points of interest from one frame to the next, the lane change assist system of the present invention can more effectively verify the pairing of such characteristics or objects. The control may track or correlate the points of interest based on the placement or location of the edges within the captured images, the general direction of travel of the detected edges or groups of edges between consecutive frames, the dimensions, size and/or aspect ratio of the detected edges or objects and/or the like. Confirming such characteristics of edges and groups of edges and objects allows the lane change assist system to track the objects from one captured frame or image to the next. If the relative speed or movement of the detected edge or object is not indicative of the relative speed or movement of a vehicle in the adjacent lane, control 16 may filter out or substantially ignore such detected edges in further processing so as to reduce subsequent processing requirements and to avoid generation of a false positive signal. Lane change assist system 10 may also be operable to connect collections of such objects or edges based on relative motion between the subject vehicle and the detected object or edges. Such connected collections may provide information about the size and shape of the detected object for object classification and identification by control 16.

It is further envisioned that lane change assist system 10 may be operable in conjunction with a lane departure warning system or other forward facing imaging system 22 of vehicle 12, such as a lane departure warning system of the type discussed below or as disclosed in U.S. provisional application Ser. No. 60/377,524, filed May 3, 2002 by McMahon for LANE DEPARTURE WARNING SYSTEM, which is hereby incorporated herein by reference, or any other lane departure warning system or the like, or a headlamp control system, such as disclosed in U.S. Pat. No. 5,796,094, which is hereby incorporated herein by reference, or any forwardly directed vehicle vision system, such as a vision system utilizing principles disclosed in U.S. Pat. Nos. 5,550,677; 5,670,935; 6,201,642; and 6,396,397, and/or in U.S. patent application, Ser. No. 09/199,907, filed Nov. 25, 1998 by Bos et al. for WIDE ANGLE IMAGE CAPTURE SYSTEM FOR VEHICLE, now U.S. Pat. No. 6,717,610, which are hereby incorporated herein by reference. The forward facing imaging system may provide an input to lane change assist system 10 to further reduce any likelihood of a false positive signal from the lane change assist system.

For example, the forward facing imaging system may detect lane markers at the road surface to detect a curvature in the road that the subject vehicle is approaching and/or traveling along. Such information may be communicated to lane change assist system 10, so that control 16 may adapt or shape the reduced image data set or zone of interest as the subject vehicle 12 enters and proceeds along the detected road curvature, as discussed above. Also, the forward facing imaging system may detect headlamps of oncoming or approaching vehicles. If the lane forward and to the left of vehicle 12 has oncoming traffic, control 16 may substantially ignore the left side of the vehicle, since the lane change assist system would not be concerned with a lane change into oncoming traffic. Also, the forward facing imaging system may detect the tail lights or rear portion of a leading vehicle in another lane, and may track the leading vehicle relative to the subject vehicle. As the subject vehicle overtakes the leading vehicle, the lane change assist system may then be alerted as to the presence of the overtaken vehicle, such that edges detected in that lane a short period of time after the overtaken vehicle leaves the range of the forward facing imaging system (the period of time may be calculated based on the relative velocity between the subject vehicle and the overtaken vehicle) may be readily identified as the now overtaken and passed vehicle. By utilizing the vehicle information of a vehicle detected by a forward facing imaging system, the lane change assist system of the present invention (or other side object detection systems or the like) may reduce the amount of processing of the captured images or detected edges, since such a vehicle may be readily identified as the vehicle that was previously detected by the forward facing imaging system. This avoids a duplication of efforts by the forward facing imaging system and lane change assist system of the vehicle.

By primarily processing image data and detected edges in certain areas and/or processing image data and detected edges that meet certain thresholds or criteria, and substantially rejecting or substantially ignoring other information or image data or edges, such as detected edges that are substantially non-horizontal, or other edges that cannot be part of a vehicle, or image data that are not representative of a zone of interest of the exterior scene, the lane change assist system of the present invention substantially reduces the image data to be processed by control 16. It is envisioned that such a reduction in the amount of image data to be processed may allow the lane change assist system to have a control which comprises a micro-processor positioned at the camera. Accordingly, the lane change assist system may be provided as a module which may be positioned at either or both sides of the vehicle, and which may be connected to an appropriate power source or control or accessory of the vehicle.

Therefore, the present invention provides a lane change assist system which is operable to detect and identify vehicles or other objects of interest sidewardly and/or rearwardly of the subject vehicle. The lane change assist system of the present invention is operable to detect edges of objects, and particularly horizontal edges of objects, to provide improved recognition or identification of the detected objects and reduced false positive signals from the lane change assist system. The lane change assist system may primarily process information or image data from a reduced set or subset of image data which is representative of a target zone or area of interest within the exterior scene and may adjust the reduced data set or target zone in response to driving or road conditions or the like. The edge detection process or algorithm of the lane change assist system of the present invention provides for a low cost processing system or algorithm, which does not require the statistical methodologies and computationally expensive flow algorithms of the prior art systems. Also, the edge detection process may detect edges and objects even when there is little or no relative movement between the subject vehicle and the detected edge or object.

The lane change assist system of the present invention thus may be operable to substantially ignore or substantially eliminate or reduce the effect of edges or characteristics which are indicative of insignificant objects, thereby reducing the level of processing required on the captured images and reducing the possibility of false positive detections. The lane change assist system may also provide a low cost and fast approximation of a longitudinal and/or lateral and/or total distance between the subject vehicle and a detected edge or object at a side of the vehicle and may adjust a threshold detection level in response to the approximated distance. The lane change assist system of the present invention may be operable to substantially ignore certain detected edges or provide a positive identification signal depending on the characteristics of the detected object or edge or edges, the driving or road conditions, and/or the distance from the subject vehicle. The present invention thus may provide a faster processing of the captured images, which may be performed by a processor having lower processing capabilities then processors required for the prior art systems.

Although the present invention is described above as a lane change assist or aid system or side object detection system, it is envisioned that many aspects of the imaging system of the present invention are suitable for use in other vehicle vision or imaging systems, such as other side object detection systems, forward facing vision systems, such as lane departure warning systems, forward park aids, passive steering systems, adaptive cruise control systems or the like, rearward facing vision systems, such as back up aids or park aids or the like, panoramic vision systems and/or the like.

For example, an object detection system or imaging system of the present invention may comprise a forward facing lane departure warning system 110 (FIG. 1), which may include an image sensor or camera 114 and a control 116 positioned on or at vehicle 12. Lane departure warning system 110 is generally shown at the front of the vehicle 12 with camera 114 positioned and oriented to capture an image of the region generally forwardly of the vehicle. However, the camera may optionally be positioned elsewhere at the vehicle, such as within the vehicle cabin, such as at an interior rearview mirror assembly of the vehicle or at an accessory module or the like, and directed forwardly through the windshield of the vehicle, without affecting the scope of the present invention. Camera 114 is operable to capture an image of a scene occurring forwardly of the vehicle and control 116 is operable to process image data of the captured images or frames to detect and monitor or track lane markers or road edges or the like or oncoming or approaching vehicles or objects, and to provide a warning or alert signal to a driver of the vehicle in response to the detected images, such as in the manner disclosed in U.S. provisional application Ser. No. 60/377,524, filed May 3, 2002 by McMahon for LANE DEPARTURE WARNING SYSTEM, which is hereby incorporated herein by reference.

Similar to camera 14 of lane change assist system 10, discussed above, camera 114 may be positioned at vehicle 12 and oriented generally downwardly toward the ground to increase the horizontal pixel count across the captured image at the important areas in front of vehicle 12, since any significant lane marking or road edge or the like, or other vehicle approaching or being approached by the subject vehicle, positioned in front of or toward a side of the subject vehicle will be substantially below the horizon and thus substantially within the captured image. The lane departure warning system of the present invention thus may provide an increased portion of the captured image or increased pixel count at important areas of the exterior scene, since the area well above the road or horizon is not as significant to the detection of lane markers and the like and/or other vehicles. Additionally, positioning the camera to be angled generally downwardly also reduces the adverse effects that the sun and/or headlamps of other vehicles may have on the captured images.

Control 116 of lane departure warning system 110 may include an edge detection algorithm or function, such as described above, which is operable to process or may be applied to the individual pixels to determine whether the image captured by the pixels defines an edge or edges of a lane marker or the like. The edge detection function or algorithm of control 116 allows lane departure warning system 110 to interrogate complex patterns in the captured image and separate out particular patterns or edges which may be indicative of a lane marker or the like, and to substantially ignore other edges or patterns which are not or cannot be indicative of a lane marker or the like and thus are insignificant to lane departure warning system 110. Other information in the captured image or frame, which is not associated with significant edges, may then be substantially ignored or filtered out by control 116 via various filtering mechanisms or processing limitations to reduce the information being processed by control 116.

Control 116 may be operable to determine which detected edges are angled or diagonal across and along the captured image and to partially filter out or substantially ignore or limit processing of vertical and/or horizontal edges. This may be preferred, since edges indicative of a lane marker may be angled within the captured image, as can be seen with reference to FIGS. 7 and 8. The control may thus process edges which are angled and which move diagonally through the scene from one frame to the next. Control 116 may be operable to skew or bias the rows of pixels in the pixelated array to simulate horizontal edges with the angled edges, such that control may detect and track such edges while substantially ignoring other edges. Control 116 may thus reject or substantially ignore edges which are not indicative of lane markers or the like (and which are not indicative of another vehicle forward of and approaching the subject vehicle), thereby reducing the data to be processed.

In order to further reduce the processing requirements and the possibility of a false detection or indication of a lane marker, and to enhance the response time and system performance, control 116 may primarily process signals or image data from pixels that are oriented or targeted or arranged or selected to capture images of objects or markers that are at least partially positioned within a predetermined or targeted area or zone of interest of the exterior scene. The zone of interest may be defined by an area or region forwardly and toward one or both sides of the subject vehicle where a lane marker or road side or edge may be positioned, which would be significant or important to lane departure warning system 110. By substantially isolating the reduced data set representative of the zone of interest, or substantially filtering out or substantially ignoring edges or signals or image data which are representative of areas outside of the zone or area of interest, the present invention may reduce the image data or information to be processed by control 116 and may substantially reduce the possibility that a false detection of a lane marker or the like will occur. Lane departure warning system 110 may also process edges or image data within a further reduced image data set representative of a targeted portion or hot zone of the zone of interest to further identify and confirm that the detected edge or edges are indicative of a lane marker or the like or a vehicle or object that is significant to the lane departure warning system, such as discussed above with respect to lane change assist system 10.

By detecting edges of objects (such as lane markers, road edges, vehicles and the like) within the zone or area of interest (and optionally adjusting the zone of interest for particular driving conditions or situations), and by focusing on or concentrating on or primarily processing the detected edges or image data which may be indicative of a lane marker or vehicle or significant object, while substantially filtering out or substantially ignoring other edges or information or image data, the present invention substantially reduces the possibility of falsely detecting lane markers or other significant vehicles or objects. Control 116 may be further operable to determine a distance between a detected object and the subject vehicle to further filter out or substantially eliminate objects that are not within a predetermined range or threshold distance from the subject vehicle and which, thus, may be insignificant to the lane departure warning system of the present invention, such as described above with respect to lane change assist system 10.

Control 116 may also be operable to determine or estimate the distance to the detected edge or object in response to the location of the pixel or pixels on the pixelated array which capture the detected edge or object, such as in the manner also discussed above. The distance may thus be determined by determining the pixel location and accessing a table or data list or array to determine the distance associated with the particular pixel.

Control 116 of lane departure warning system 110 may also be operable to determine an intensity or brightness level associated with the detected edges and to substantially eliminate edges which do not significantly change in brightness level or intensity level from one side of the detected edge to the other. This is preferred, since thin branches on the road and/or many other small articles or objects may not resolve, and thus may result in single edges that do not significantly change in brightness or intensity (or color if a color system is used) across their detected edges. However, a sharp or significant change in brightness or intensity would be expected at a detected edge of a lane marker (since a lane marker is typically a white or yellow line segment along a dark or black or gray road surface) or an automotive body panel or bumper or other component or structure of a vehicle or the like. Accordingly, control 16 may substantially eliminate or substantially ignore edges or objects which do not have a significant brightness or intensity change thereacross. By substantially eliminating such insignificant edges, control 16 may further significantly reduce the computational requirements or processing requirements, while also significantly reducing the possibility of a false detection of a lane marker or vehicle. It is further envisioned that lane departure warning system 110 may be capable of detecting lane markings and road edges and other vehicles and modifying the alert signal or process in response to the type of marking, surrounding vehicles or the like and/or the vehicle movement, such as disclosed in U.S. provisional application Ser. No. 60/377, 524, filed May 3, 2002 by McMahon for LANE DEPARTURE WARNING SYSTEM, which is hereby incorporated herein by reference.

Figure 12:
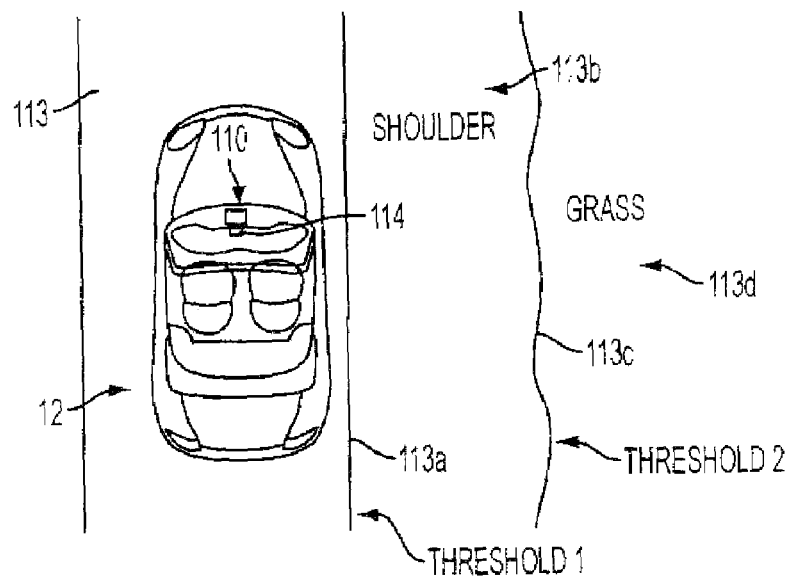
FIG. 12 is a top plan view of a vehicle driving along a road and incorporating a lane departure warning system of the present invention.
Figure 13:
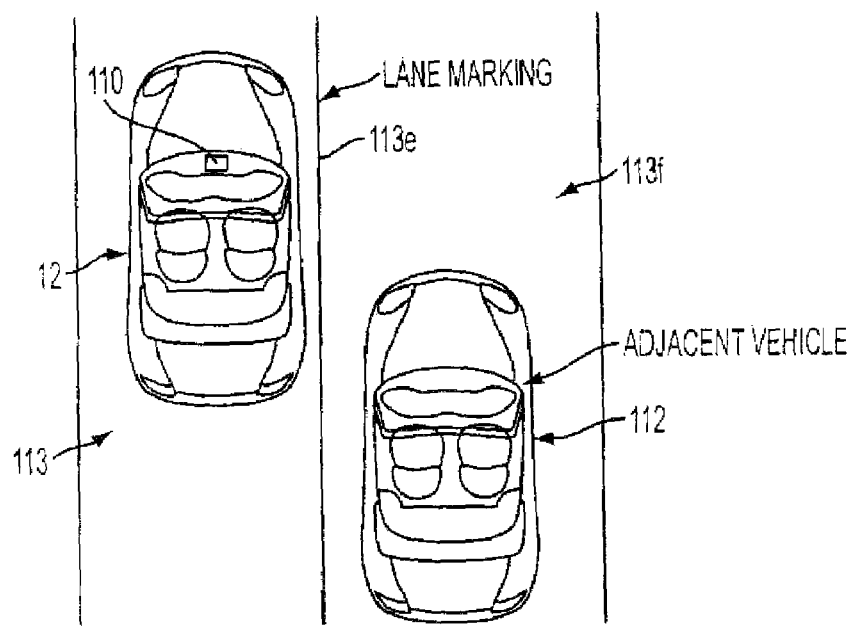
FIG. 13 is another top plan view of the vehicle driving along a road, with another vehicle in an adjacent lane.

With reference to FIGS. 12 and 13, lane departure warning system 110 may provide a warning signal to a driver of vehicle 12 when the vehicle is about to depart from its lane or road 113. The lane departure warning system 110 is operable in response to imaging sensor or camera 114 positioned at a forward portion of the vehicle 12 (and may be positioned at a vehicle bumper area or at a windshield area, such as at an interior rearview mirror or attachment thereto, without affecting the scope of the present invention) and having a field of view directed generally forwardly with respect to the direction of travel of vehicle 12. The imaging sensor 114 is operable to capture an image of a scene generally forwardly (and preferably at least partially sidewardly) of the vehicle. The lane departure warning system includes image processing controls or devices which may process the images captured to detect and identify various objects within the image.

The imaging sensor useful with the present invention is preferably an imaging array sensor, such as a CMOS sensor or a CCD sensor or the like, such as disclosed in commonly assigned U.S. Pat. Nos. 5,550,677; 5,670,935; 5,796,094; and 6,097,023, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, which are hereby incorporated herein by reference. The imaging sensor may be implemented and operated in connection with other vehicular systems as well, or may be operable utilizing the principles of such other vehicular systems, such as a vehicle headlamp control system, such as the type disclosed in U.S. Pat. No. 5,796,094, which is hereby incorporated herein by reference, a rain sensor, such as the types disclosed in commonly assigned U.S. Pat. Nos. 6,353,392; 6,313,454; and/or 6,320,176, which are hereby incorporated herein by reference, a vehicle vision system, such as a forwardly directed vehicle vision system utilizing the principles disclosed in U.S. Pat. Nos. 5,550,677; 5,670,935; and 6,201,642, and/or in U.S. patent application Ser. No. 09/199,907, filed Nov. 25, 1998 by Bos et al. for WIDE ANGLE IMAGE CAPTURE SYSTEM FOR VEHICLE, now U.S. Pat. No. 6,717,610, which are hereby incorporated herein by reference, a traffic sign recognition system, a system for determining a distance to a leading vehicle or object, such as using the principles disclosed in U.S. patent application Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference, and/or the like.

The lane departure warning system of the present invention is operable to provide a warning signal to a driver of the vehicle under at least one of at least the following three conditions:

1) the vehicle is moving toward the edge of the road at a rapid speed indicating that the vehicle will actually depart from the pavement or shoulder;

2) the vehicle is moving into a lane with oncoming traffic present in that lane; and/or 3) the vehicle is moving into a lane with traffic flowing in the same direction and there is an adjacent vehicle in that lane (regardless of turn signal use).

The lane departure warning system may be operable in response to one or more of the detected conditions and may be further operable in response to various vehicle characteristics or parameters, such as vehicle speed, a distance to the lane marker, shoulder, other vehicle, or any other relevant distance, road conditions, driving conditions, and/or the like.

With respect to the first condition (shown in FIG. 12), the lane departure warning system may be operable in response to a single forward facing imaging sensor or camera, to establish and track the road edge as defined by two thresholds:

1) threshold 1: the edge 113*a* of the road or pavement 113 (the intersection of the pavement 113 and the shoulder 113*b*); and/or 2) threshold 2: the edge 113*c* of the shoulder 113*b* (the intersection of the shoulder 113*b* and the grass 113*d*).

The lane departure warning system of the present invention may then be operable to provide an audible warning, such as a rumble strip sound, when the vehicle is approaching threshold 1 and the vehicle is moving above an established speed. The lane departure warning system may then be operable to provide a more urgent audible warning, such as an alarm, when the vehicle is approaching threshold 2 and is moving above the established speed. If the road does not have a shoulder, such as on some rural roads, there is only one threshold and this may correspond to a threshold 2 warning. The lane departure warning system may be operable to provide the warning signal or signals in response to the vehicle being a particular distance from the detected lane or road or shoulder. The distances to the threshold markings at which the lane departure warning system initiates the warning signal or signals may vary depending on the speed of the vehicle, or other conditions surrounding the vehicle, such as road conditions, driving conditions, or the like.

With respect to the second condition, the lane departure warning system may be operable in response to a single forward facing camera to monitor the lane markings 113*e* along the road surface and monitor the potential presence of oncoming traffic in an adjacent lane or lanes. Once the presence of oncoming traffic has been established, the lane departure warning system may issue an urgent audible warning if the vehicle begins to cross the lane marking 113*e*. Furthermore, if the vehicle has already begun to cross into the oncoming traffic lane before oncoming traffic is detected, the lane departure warning system may issue the urgent warning when oncoming traffic is detected.

Similar to the first condition, the lane departure warning system may be operable in response to the second condition to initiate the warning signal in response to different distances between the subject vehicle and the approaching vehicle, depending on the speed of one or both vehicles, the driving conditions, the road conditions and/or the like.

With respect to the third condition (shown in FIG. 13), the lane departure warning system of the present invention may be operable in response to a single forward facing camera and at least one, and optionally two, rearward and/or sideward facing cameras, to monitor the lane markings and the potential presence of adjacent traffic or vehicle or vehicles 112 in an adjacent lane 113*f*, which may be traveling in the same direction as the subject vehicle 12. Once the presence of adjacent traffic has been established, the lane departure warning system may issue an urgent audible warning to the driver of the vehicle if the subject vehicle begins to cross the lane marking 113*e*. Furthermore, if the subject vehicle has already begun to cross into the adjacent lane and then subsequently an adjacent vehicle is detected, the lane departure warning system may issue the urgent warning signal to the driver of the vehicle.

Again, the lane departure warning system may be operable to initiate the warning signal or signals in response to varying threshold parameters, which may vary depending on the speed of the subject vehicle, the speed of the other detected vehicle, the relative speed of the vehicles, the driving conditions, the road conditions and/or the like. The lane departure warning system of the present invention may be operable to differentiate between the different types of lane markings along roads, such as between solid and dashed lines and double lines.

Optionally, the lane departure warning system may be further operable to detect and recognize stop lights and/or stop signs and/or other road or street signs or markings, and to provide a warning signal to the driver of the vehicle in response to such detection. It is further envisioned that the lane departure warning system of the present invention may be operable to provide an alarm or broadcast an alarm or warning signal on a safety warning band when the forward facing camera detects a stop light or stop sign and the system determines that the vehicle is not going to stop based on the vehicle's current speed and deceleration. This provides a signal or alarm to crossing drivers to warn them of an unsafe condition.

Optionally, the lane departure warning system of the present invention may be operable to determine the road conditions of the road on which the vehicle is traveling and/or the driving conditions surrounding the vehicle. The system may then provide the warning signal or signals in response to variable threshold values, such as different vehicle speeds or distances or the like. For example, wet or snowy roads would change the distance and/or speed thresholds at which the lane departure warning system would provide the warning signal or signals. Also, because darkened or raining conditions may affect visibility of lane markers, road edges and other vehicles, the lane departure warning system of the present invention may be operable to provide a warning signal sooner or at a greater distance from the marker, edge or vehicle in such low visibility conditions. This provides the driver of the subject vehicle a greater amount of time to respond to the warning in such conditions.

The lane departure warning system of the present invention may be integrated with a side object detection system (SOD). For example, the vehicle may be equipped with a camera or image-based side object detection system or a Doppler radar-based side object detection system or other such systems (such as mounted on the side rearview mirrors or at the side of the vehicle) for detecting objects and/or vehicles at one or both sides of the subject vehicle. The lane departure warning threshold level or sensitivity at which the lane departure warning system generates a warning signal may then be adjustable in response to detection of a vehicle or object at a side of the subject vehicle and determination of the location and speed of the detected vehicle. Optionally, the signal generated may increase or decrease in intensity or volume in response to the position or speed of an object or vehicle detected by the side object detection system. For example, the threshold level may take into account the approach speed of the other vehicle to the subject vehicle, and may provide a louder or brighter warning to the driver of the subject vehicle if the approach speed is above a particular threshold level or threshold levels.

The lane departure warning system may be provided with a multi-feature or multi-function forward facing imaging system. The imaging system may combine two or more functions, such as an intelligent headlamp controller (such as the type disclosed in U.S. Pat. Nos. 5,796,094 and 6,097,023, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, which are hereby incorporated herein by reference), an image-based smart wiper controller, a rain sensor (such as the types disclosed in commonly assigned U.S. Pat. Nos. 6,353,392; 6,313,454; and/or 6,320,176, which are hereby incorporated herein by reference), an image-based climate control blower controller, an image-based or image-derived or partially derived adaptive cruise-control system (where the imaging may be primary or secondary to a forward facing Doppler radar), and/or other vision systems (such as a forwardly directed vehicle vision system utilizing the principles disclosed in U.S. Pat. Nos. 5,550,677; 5,670,935; and 6,201,642, and/or in U.S. patent application Ser. No. 09/199, 907, filed Nov. 25, 1998 by Bos et al, for WIDE ANGLE IMAGE CAPTURE SYSTEM FOR VEHICLE, now U.S. Pat. No. 6,717,610, which are all hereby incorporated herein by reference), a traffic sign recognition system, a system for determining a distance to a leading vehicle or object (such as using the principles disclosed in U.S. patent application Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference), and/or the like.

For example, an embodiment of the lane departure warning system of the present invention may be incorporated with or integrated with an intelligent headlamp control system (such as described in U.S. Pat. Nos. 5,796,094 and 6,097,023, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, which are hereby incorporated herein by reference) having an imaging array sensor feeding a signal or image to a microcontroller (which may comprise a microprocessor or microcomputer), which is operable to adjust a state of the headlamps in response to a captured image of the scene forwardly of the vehicle. The image captured by the imaging sensor may be analyzed for light sources of interest for the headlamp control, and also for lane markings, road edges, and other objects of interest (such as road signs, stop signs, stop lights and/or the like) for the lane departure warning system. Optionally, the lane departure warning system may be integrated with or tied to an existing headlamp control of the vehicle.

The lane departure warning system of the present invention thus may be implemented as part of one or more other imaging-based systems, and thus may share components, hardware and/or software with the other systems to reduce the incremental costs associated with the lane departure warning system and with the other systems as well. Accordingly, multiple systems may be provided by an automotive supplier as part of a common platform or module for each vehicle of a particular vehicle line or model. The vehicle manufacturer may then choose to activate or enable one or more of the systems of the module, depending on which options are selected on a particular vehicle. Therefore, the addition or selection of the lane departure warning system, or of one or more other imaging-based systems, is associated with an incremental addition of hardware and/or software, and thus of associated costs, in order to install and enable the system on a particular vehicle. The imaging array sensor or sensors of the module may then be interrogated by an appropriate processor or software to extract the light sources or objects of interest or pixels of interest for each respective system of the common or unitary module. For example, an image captured by the imaging array sensor or camera may be processed or analyzed one way for a headlamp control system, and then processed or analyzed another way for the lane departure warning system or for any other enabled functions or systems of the common module. The software may further include common blocks or functions or macros to further enhance the sharing of software between the systems.

Accordingly, a unitary module may be provided to a vehicle assembly plant and may include multiple features, systems or functions, such that the desired features, systems or functions may be enabled for a particular vehicle, with minimal additional software or components or hardware being associated with the features, systems or functions that are enabled. The anchor system of the common or unitary module or platform may be an intelligent headlamp controller, with the additional systems, such as the lane departure warning system of the present invention, being added to or integrated with the anchor system.

The lane departure warning system and any other associated imaging-based systems may be included as part of an interior rearview mirror assembly or as part of an electronic windshield module and/or accessory module assembly, such as disclosed in commonly assigned U.S. Pat. Nos. 6,243,003; 6,278,377; and 6,433,676; U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268; Ser. No. 09/585,379, filed Jun. 1, 2000 for REARVIEW MIRROR ASSEMBLY WITH UTILITY FUNCTIONS; Ser. No. 09/466,010, filed Dec. 17, 1999 by DeLine et al. for INTERIOR REARVIEW MIRROR SOUND PROCESSING SYSTEM, now U.S. Pat. No. 6,420,975; and Ser. No. 10/355,454, filed Jan. 31, 2003 by Schofield et al. for VEHICLE ACCESSORY MODULE, now U.S. Pat. No. 6,824,281, which are all hereby incorporated herein by reference.

Therefore, the lane departure warning system of the present invention provides a warning signal or signals to a driver of a vehicle based on the detection of various objects, vehicles and conditions surrounding the vehicle. The lane departure warning system of the present invention is thus less likely to provide a warning signal to a driver of the vehicle when the driver intends to maneuver the vehicle in that manner, and thus where such a warning signal is not needed or wanted. The lane departure warning system of the present invention thus avoids annoying, unnecessary warnings, and thus provides improved responses by the driver of the vehicle, since the driver is less likely to ignore the signal provided by the lane departure warning system. The lane departure warning system of the present invention may be implemented with or integrated with one or more other imaging-based systems to reduce the incremental components, hardware, software and costs associated with the implementation of the lane departure warning system.

Optionally, the object detection system or imaging system of the present invention may be operable in conjunction with a passive steering system 210 (FIG. 1), which is operable to adjust or bias the steering direction of the vehicle toward a center region of a lane in response to detection of the lane markers or road edges or the like by the imaging system. Passive steering system 210 may be in communication with or connected to a steering system of the vehicle and may adjust or bias the steering direction of the vehicle slightly if the lane departure warning system detects a slow drifting of the vehicle out of its lane and may be further operable in response to a detected road curvature ahead of the vehicle. The passive steering system 210 may steer the vehicle back into its lane or keep the vehicle in its lane when such a drifting condition is defected. The passive steering system may function to bias the steering of the vehicle toward the center of the occupied lane, but may be easily overcome by manual steering of the vehicle by the driver, such that the driver at all times maintains ultimate control over the steering of the vehicle. The passive steering system thus may function as a lane detent which maintains the vehicle in its lane, but may be easily overcome or disabled if the steering wheel is manually turned or if a turn signal is activated or the like.

The passive steering assist system of the present invention thus may reduce driver fatigue from driving a vehicle under conditions which require constant driver steering input or adjustment, such as in windy conditions and the like. The passive steering assist system thus may reduce lane drift from side to side within a lane. Also, overall safety may be improved by the reduction in undesired lane maneuvers. Although described as being responsive to the imaging system of the present invention, the passive steering system of the present invention may be responsive to other types of lane departure warning systems or other types of vision or imaging systems, without affecting the scope of the present invention.

Optionally, the object detection system or imaging system of the present invention may be operable in connection with an adaptive speed control system 310 (FIG. 1), which may adjust the cruise control setting or speed of the vehicle in response to road or traffic conditions detected by the imaging system. For example, adaptive speed control system 310 may reduce the set speed of the vehicle in response to the imaging system (or other forward facing vision system) detecting a curve in the road ahead of the vehicle. The vehicle speed may be reduced to an appropriate speed for traveling around the curve without the driver having to manually deactivate the cruise control. The adaptive speed control may then resume the initial speed setting after the vehicle is through the turn or curve and is again traveling along a generally straight section of road. Adaptive speed control 310 may also reduce the speed of the vehicle or even deactivate the cruise control setting in response to a detection by the lane departure warning system or other vision system of taillights or headlamps of another vehicle detected in front of the subject vehicle and within a threshold distance of the subject vehicle or approaching the subject vehicle at a speed greater than a threshold approach speed, or in response to detection of other objects or conditions which may indicate that the speed of the vehicle should be reduced.

Additionally, because the imaging system, such as a forward facing lane departure warning system, may track the lane curvature, the system may also be able to determine if a vehicle which appears in front of the subject vehicle is actually in the same lane as the subject vehicle or if it is in an adjacent lane which is curving with the section of road. The imaging system and adaptive speed control system may then establish if the vehicle speed should be reduced in response to the road curvature and the presence of another vehicle at the curve. Although described as being responsive to the imaging system or lane departure warning system of the present invention, the adaptive speed control system of the present invention may be responsive to other types of lane departure warning systems or other types of vision or imaging systems, particularly other types of forward facing imaging systems, without affecting the scope of the present invention.

It is further envisioned that the imaging system, which may comprise an object detection system, a lane change assist system, a side object detection system, a lane departure warning system or other forward facing vision system, a rear vision system or park aid or panoramic view system, a passive steering system, an adaptive cruise control system or the like, may be in communication with a security monitoring system. The vision or image data from the imaging system may be transmitted to a remote device, such as the vehicle owner's computer monitor or other personal display system remote from the vehicle, so that the owner of the vehicle or other person may view the status of the area surrounding the vehicle when the owner or other person is not in the vehicle. Also, the vision or image data may be provided to or made available to the local police authorities or the like in the event of a theft of the vehicle or of an accident involving the vehicle or of the vehicle being otherwise inoperable (such as when the motorist is stranded). The police or emergency services or the like may use the vision or image data to determine the vehicle location and possibly the condition of the vehicle and/or the driver and/or the passengers. It is further envisioned that the vision or image data may be used in conjunction with the global positioning system (GPS) of the vehicle to precisely locate or pinpoint the vehicle location. The vision or image data may be transmitted to the remote device or to the emergency services or the like via various transmission devices or systems, such as utilizing Bluetooth technology or the like, without affecting the scope of the present invention.

Therefore, the present invention provides a vision or imaging system or object detection system which is operable to detect and process edges within a captured image or images to determine if the edges are indicative of a significant vehicle or object or the like at or near or approaching the subject vehicle. The imaging system may primarily process a reduced image data set representative of a zone of interest of the exterior scene and may process edges that are detected which are representative of an object within the zone of interest of the captured image. The imaging system may adjust the reduced data set or zone of interest in response to various conditions or characteristics or criteria. The imaging system may comprise an object detection system or a lane change assist system operable to detect objects or other vehicles at one or both sides of the subject vehicle. The object detection system may determine the distance to the detected object or edge and may adjust threshold criterion in response to the determined or estimated or calculated distance.

Optionally, the imaging system may comprise a forward facing lane departure warning system which may be operable to detect lane markers or the like and/or vehicles in front of the subject vehicle and to provide an alert signal to the driver of the vehicle that the vehicle is leaving its lane. The lane departure warning system may primarily process edges detected within a zone of interest within the captured image. The lane departure warning system may determine a distance to the detected edge or object and may vary or adjust threshold criterion in response to the determined or estimated or calculated distance.

The forward facing imaging system may be in communication with the lane change assist system of the vehicle and/or may be in communication with other systems of the vehicle, such as a side object detection system, a passive steering system or an adaptive speed control system or the like. The imaging system may communicate to the lane change assist system that the vehicle is approaching a curve in the road or that another vehicle is being approached and passed by the subject vehicle to assist in processing the image data captured by the sensor or camera of the lane change assist system. Optionally, a passive steering system may adjust a steering direction of the vehicle in response to the imaging system, or an adaptive speed control system may adjust a cruise control setting of the vehicle in response to the imaging system. Optionally, an output of the imaging system may be provided to or communicated to a remote receiving and display system to provide image data for viewing at a location remote from the subject vehicle.

Changes and modifications in the specifically described embodiments may be carried our without departing from the principles of the present invention, which is intended to limited only by the scope of the appended claims, as interpreted according to the principles of patent law.

The embodiments of the invention in which an exclusive property or privilege is claimed are defined as follows:

1. A passive steering system of a vehicle comprising:
   a steering system operable to adjust the steering direction of the vehicle; and
   a control responsive to an image capture device capable of detecting lane markers along the road surface, said control being operable to control said steering system to adjust the steering direction of the vehicle in response to an output of said image capture device indicative of the vehicle drifting out of its occupied lane, wherein said control is operable to not control said steering system in response to activation of a turn signal of the vehicle.

2. The passive steering system of claim 1, wherein said steering system is manually controllable irrespective of said control.

3. The passive steering system of claim 1, wherein said image capture device is part of or in communication with a lane departure warning system of the vehicle.

4. A passive steering system of a vehicle comprising:
   a steering system operable to adjust the steering direction of the vehicle;
   a control responsive to an image capture device capable of detecting lane markers along the road surface, said control being operable to control said steering system to adjust the steering direction of the vehicle in response to an output of said image capture device indicative of the vehicle drifting out of its occupied lane; and
   wherein said control processes said captured image, said captured image comprising an image data set representative of the exterior scene, said control including a microprocessor comprising an edge detection algorithm, said control applying said edge detection algorithm to a reduced image data set of said image data set, said reduced image data set being representative of a target zone of said captured image, said control being operable to process said reduced image data set more than other image data, which are representative of areas of said captured image outside of said target zone, to detect edges of lane markers present exteriorly of the vehicle and within said target zone.

5. The passive steering system of claim 4, wherein said steering system is manually controllable irrespective of said control.

6. The passive steering system of claim 4, wherein said image capture device is part of or in communication with a lane departure warning system of the vehicle.

* * * * *

UNITED STATES PATENT AND TRADEMARK OFFICE
CERTIFICATE OF CORRECTION

PATENT NO. : 7,679,498 B2 Page 1 of 1
APPLICATION NO. : 12/329029
DATED : March 16, 2010
INVENTOR(S) : John A. Pawlicki et al.

It is certified that error appears in the above-identified patent and that said Letters Patent is hereby corrected as shown below:

Column 28:
Line 3, "defected" should be --detected--.

Signed and Sealed this

Thirteenth Day of July, 2010

David J. Kappos
*Director of the United States Patent and Trademark Office*